United States Patent
Itoh et al.

(10) Patent No.: US 8,157,395 B2
(45) Date of Patent: Apr. 17, 2012

(54) FOLDING OUTER MIRROR

(75) Inventors: Masahiko Itoh, Shizuoka (JP);
Takanobu Matsushita, Shizuoka (JP);
Yusuke Hagiwara, Fujieda (JP)

(73) Assignee: Murakami Corporation, Shizuoka (JP)

( * ) Notice: Subject to any disclaimer, the term of this patent is extended or adjusted under 35 U.S.C. 154(b) by 106 days.

(21) Appl. No.: 12/762,591

(22) Filed: Apr. 19, 2010

(65) Prior Publication Data
US 2010/0302659 A1     Dec. 2, 2010

(30) Foreign Application Priority Data

May 27, 2009 (JP) ................................ 2009-128135
May 27, 2009 (JP) ................................ 2009-128136

(51) Int. Cl.
*G02B 7/182* (2006.01)

(52) U.S. Cl. ...................................................... 359/872

(58) Field of Classification Search ................. 359/841, 359/871, 872, 877
See application file for complete search history.

(56) References Cited

U.S. PATENT DOCUMENTS

| | | | | |
|---|---|---|---|---|
| 4,893,916 A * | 1/1990 | Sakuma et al. | ............... | 359/841 |
| 6,133,704 A * | 10/2000 | Yoshida et al. | ............... | 359/877 |
| 6,637,898 B2 * | 10/2003 | Hattori et al. | ................. | 359/841 |
| 2007/0165315 A1 * | 7/2007 | Proctor | ......................... | 359/871 |
| 2009/0279195 A1 | 11/2009 | Itoh et al. | | |

FOREIGN PATENT DOCUMENTS

| | | |
|---|---|---|
| JP | 2004-9806 | 1/2004 |
| JP | 2006-282088 | 10/2006 |

* cited by examiner

*Primary Examiner* — Euncha Cherry
(74) *Attorney, Agent, or Firm* — Greenblum & Bernstein P.L.C.

(57) ABSTRACT

The object of this invention is to provide a folding outer mirror, in which the cost reduction, the prevention of large sizes and heavy weights, and higher stiffness of the stopper mechanism can be obtained. The folding outer mirror includes a mirror base extending outside from a side surface of vehicle body, a mirror assembly attached rotatably to the mirror base, and a stopper mechanism for stopping the mirror assembly at a predetermined position. The stopper mechanism is provided with a base-side engaging surface formed in the mirror base, and a body-side engaging surface formed in the mirror assembly and being in plane contact with the base-side engaging surface at a predetermined position. The base-side engaging surface and the body-side engaging surface are formed such that a raising angle relative to a rotating direction of the mirror assembly becomes a sharp angle.

15 Claims, 14 Drawing Sheets

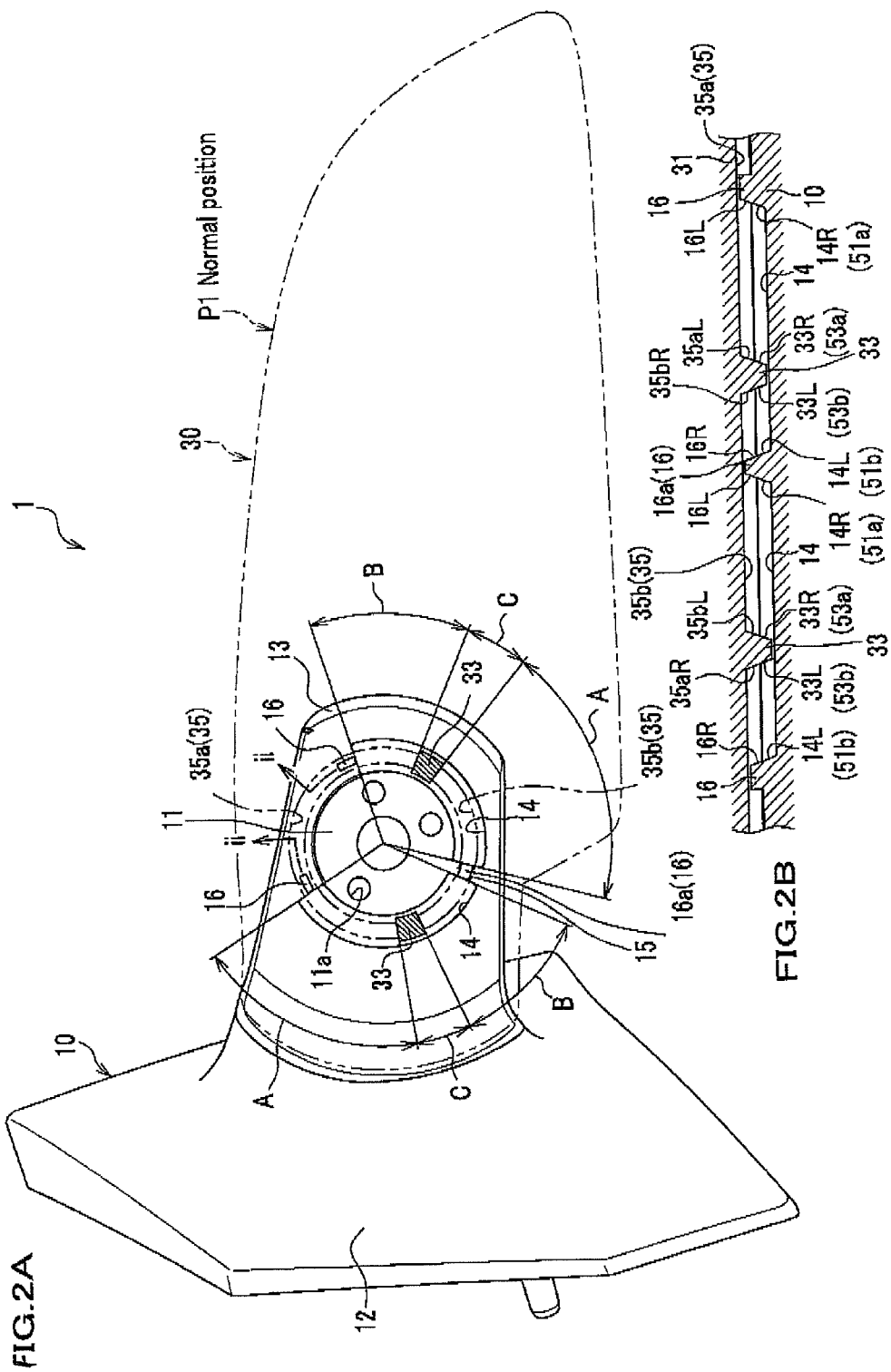

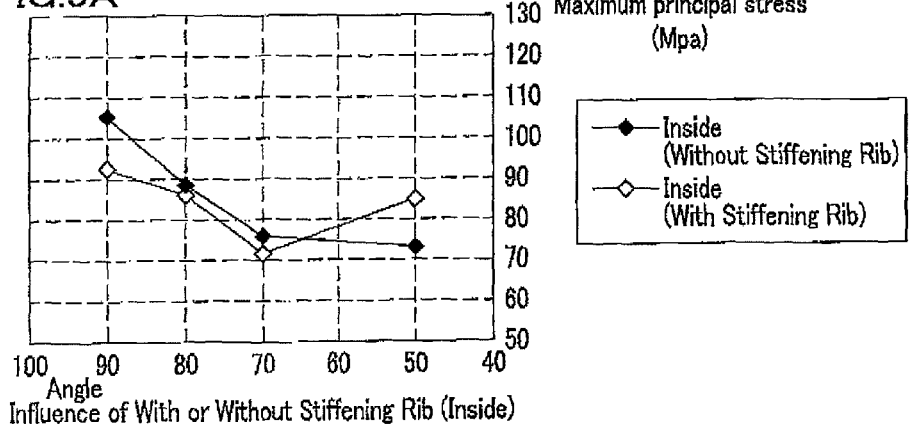
FIG.9A Influence of With or Without Stiffening Rib (Inside)
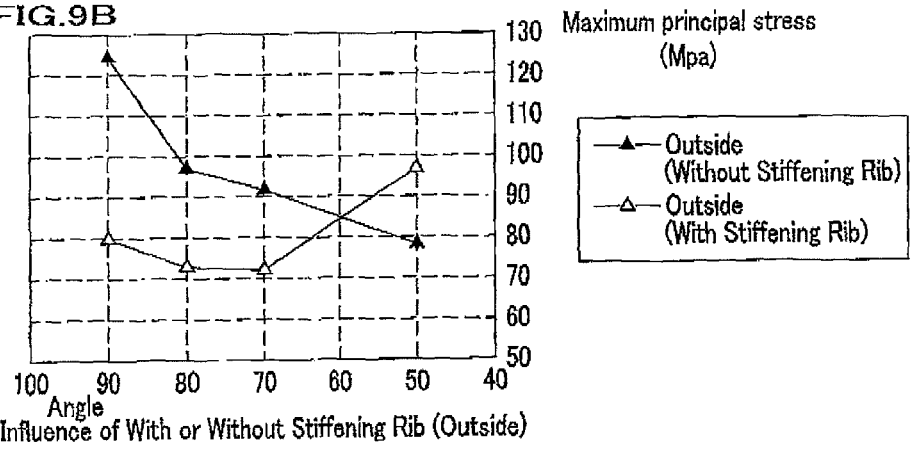
FIG.9B Influence of With or Without Stiffening Rib (Outside)
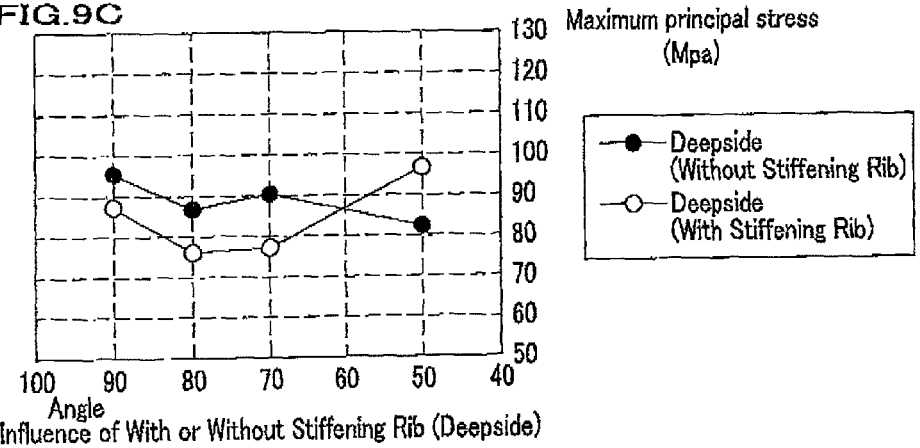
FIG.9C Influence of With or Without Stiffening Rib (Deepside)

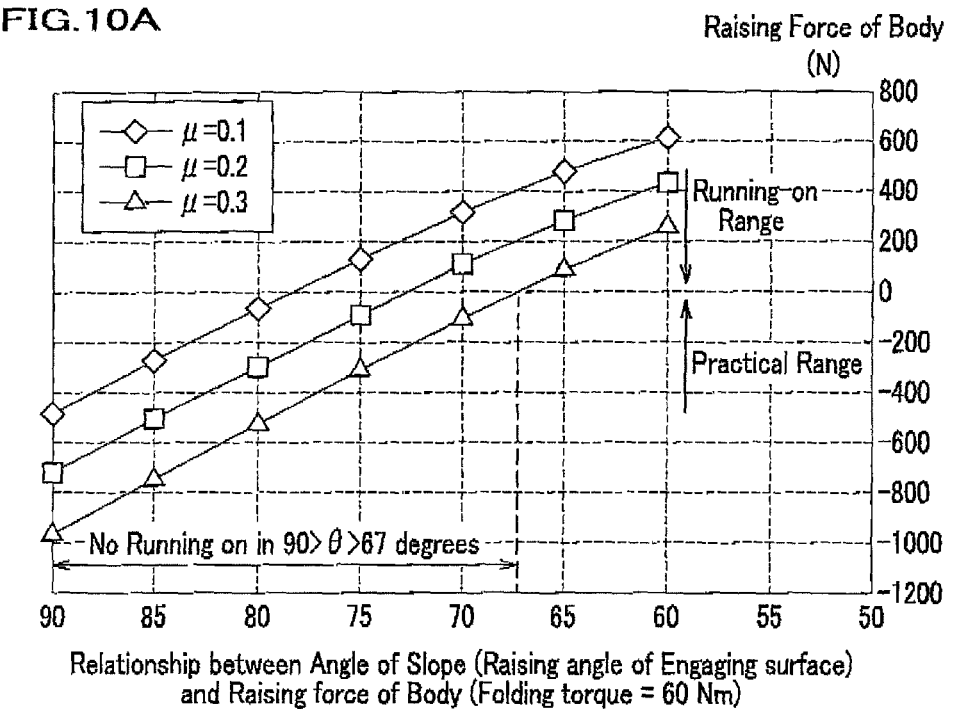
FIG.10A Relationship between Angle of Slope (Raising angle of Engaging surface) and Raising force of Body (Folding torque = 60 Nm)
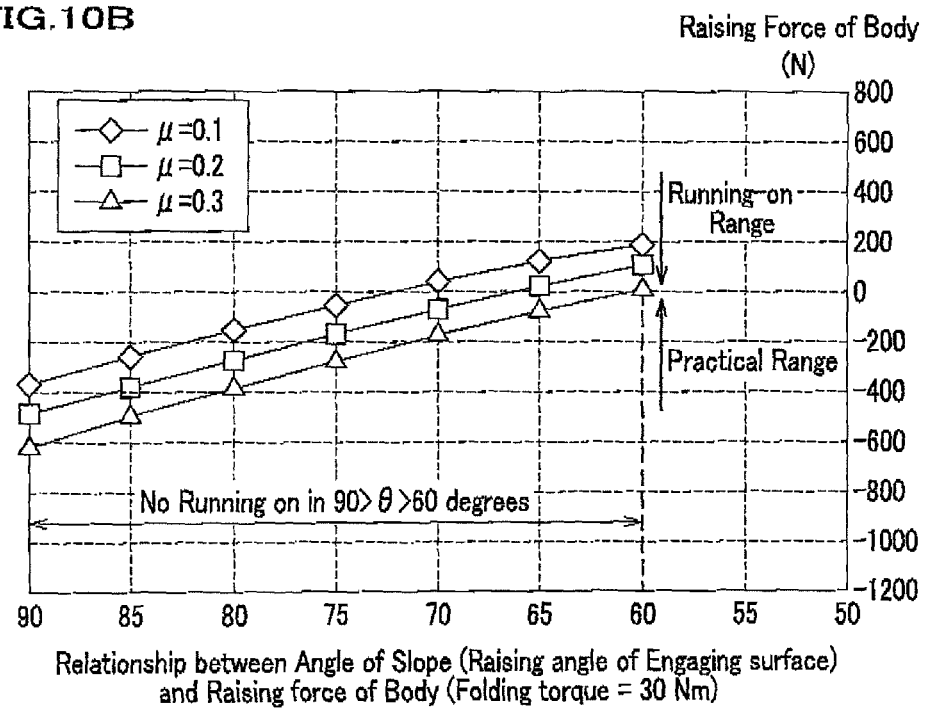
FIG.10B Relationship between Angle of Slope (Raising angle of Engaging surface) and Raising force of Body (Folding torque = 30 Nm)

FOLDING OUTER MIRROR

FIELD OF THE INVENTION

The present invention relates to a folding outer mirror providing with a rotatable mirror assembly mounted in the side of vehicle body.

BACKGROUND OF THE INVENTION

As an outer mirror attached to the side of vehicle body, it is, in general, adapted to use a folding outer mirror, which is rotated between a normal position to direct a mirror surface of a mirror approximately at a right angle relative to the side of vehicle body and a folded position to be folded in the side of vehicle body. In the folded position, the mirror surface is, in general, arranged to direct a rear position opposing to the side of vehicle body by rotating the mirror assembly in a direction of vehicle body. The folding outer mirror is constituted to rotate to a forward retracted position prepared for outside forces such as an unexpected crash or contact from the rear side of car such that the mirror assembly can be retracted by rotating in the forward.

The folding outer mirror is provided with a mirror base extending outside from the side surface of vehicle body and a mirror assembly being rotatably mounted in the mirror base. The folding outer mirror is provided with a positioning mechanism to stop the mirror assembly at a normal position and a stopper mechanism to stop the mirror assembly at a folded position or a retracted position when the mirror assembly rotates from the normal position to a rear folded position or a forward retracted position.

The stopper mechanism is constituted to compose, for example, of an arcuate groove formed in the mirror base and a convex part provided in the mirror assembly and to move the convex part along the arcuate groove. For example, it may be referred to Japanese Patent unexamined laid-open publication No. 9806 of 2004 or No. 282088 of 2006. In such a stopper mechanism, when the mirror assembly is folded in a folded position, one side end surface of the convex part (an engaging surface) is in contact with a circumferential end surface (an engaging surface) of the arcuate groove, thus to regulate a movement of the mirror assembly. When the mirror assembly is rotated to a retracted position, the other side end surface of the convex part (an engaging surface) is in contact with the other end (an engaging portion), thus to regulate a movement of the mirror assembly. As above mentioned, when the folding outer mirror is rotated rearwards or forwards from a normal position, the folding outer mirror is designed to stop at a folded position or a retracted position by contacting each side end surface of the convex part with one end or the other end of the arcuate groove. The engaging surface as contacted and engaged with each other is formed on a plane crossing at a right angle relative to a rotating direction of the mirror assembly.

SUMMARY OF THE INVENTION

When the mirror assembly rotates to a retracted position, large force caused by unexpected crash or contact may be urged to an arcuate groove formed in the mirror base and a convex part provided in the mirror assembly. Thus, the arcuate groove and the convex part are required to have a high stiffness. In conventional folding outer mirrors, the arcuate groove and the convex part are composed of high-intensity materials such as metal or plastics containing glass fiber in order to have the predetermined stiffness as required. As a result, conventional folding outer mirrors may result in an increase in cost. Then, it is considered to require a large contact area between the large convex part and the arcuate groove so as to have the stiffness as required without high-intensity materials. In this case, it results in large sizes and heavy weights of the folding outer mirror, as the stopper mechanism becomes too large.

Accordingly, an object of the present invention is to provide a folding outer mirror having the desired cost reduction, the prevention of large sizes and heavy weights, and the high stiffness of the stopper mechanism.

The invention according to Claim 1 invented so as to solve the above problem is a folding outer mirror, which includes a mirror base extending outside from the side surface of vehicle body, a mirror assembly attached rotatably to the mirror base, and a stopper mechanism for stopping the mirror assembly at a predetermined position. Then, it is characterized in that the stopper mechanism comprises a base-side engaging surface formed in the mirror base, and a body-side engaging surface formed in the mirror assembly and being in plane contact with the base-side engaging surface at a predetermined position. Furthermore, the base-side engaging surface and the body-side engaging surface are constituted such that a raising angle relative to a rotating direction of the mirror assembly is a sharp angle.

"A rotating direction of the mirror assembly" in the invention means a tangential direction at any point in a rotating circumferential direction. "A raising angle" means an angle raising the engaging surface directing from one side to the other side of the mirror base and the mirror assembly, and an angle formed in the solid side of the engaging surface relative to the rotating direction.

According to the above constitution, the force acting directly on plane, which is perpendicular to the engaging surface, becomes smaller than the outside force urged in the rotating direction, and the contact area between the engaging surfaces is larger compared with the case where the engaging surface poses at a right angle relative to the rotating direction. That is, as the contact pressure in the contact surface is small, the same or similar effect to increase the stiffness of the mirror base and the mirror assembly can be obtained. Furthermore, as an angle of the member forming the engaging surface relative to the rotating direction becomes an obtuse angle by making the raising angle from the rotating direction of the engaging surface to be a sharp angle, the stress concentration factor is greatly improved and the stress concentration can be prevented. Therefore, the stopper mechanism having a high degree of stiffness can be obtained without using high-intensity material and the cost reduction thereof can be also obtained. Furthermore, as the engaging surface itself is not required to be large, large sizes and heavy weights of the stopper mechanism can be prevented.

The invention relating to Claim 2 is characterized by the following elements on the basis of the folding outer mirror as described in Claim 1. That is, the predetermined position is two positions, that is, at the folded position and at the retracted position of the mirror assembly, and the base-side engaging surface and the body-side engaging surface are respectively formed to have two surfaces.

in such a constitution, in the folded position and the retracted position receiving a comparatively large stress caused by outside forces such as an unexpected crash or contact, the higher stiffness of the mirror base and the mirror assembly can be obtained. Accordingly, it is effective and advantageous therein.

The invention relating to Claim 3 is characterized by the following elements on the basis of the folding outer mirror as described in Claim 1 or 2. That is, the mirror base is provided with the base-side arcuate groove having the same center as a rotation center of the mirror assembly, and the mirror assembly is provided with the body-side convex part inserting in the base-side arcuate groove. Further, the base-side engaging surface is constituted to have a circumferential end surface of the base-side arcuate groove, and the body-side engaging surface is constituted to have an end surface in a rotating direction of the body-side convex part.

In such a constitution, as a thick-wall part can be obtained in the back of the base-side engaging surface by providing the base-side arcuate groove in the mirror base, the stiffness thereof can be further improved to be higher.

The invention relating to Claim 4 is characterized by the following element on the basis of the folding outer mirror as described in Claim 3. That is, the body-side convex part is integrally formed to have a stiffening rib extending in a circumferential direction.

In such a constitution, as the body-side convex part itself becomes higher in stiffness as a single unit of the body-side convex part itself, still higher stiffness of the stopper mechanism can be obtained.

The invention relating to Claim 5 is characterized by the following elements on the basis of the folding outer mirror as described in Claim 1 or 2. That is, the mirror base is provided with the base-side convex part, the mirror assembly is provided with the body-side convex part engaged with the base-side convex part. Furthermore, the base-side engaging surface is constituted at an end surface in a rotating direction of the mirror assembly of the base-side convex part, and the body-side engaging surface is constituted at an end surface in a rotating direction of the body-side convex part.

In such a constitution, a higher stiffness of the stopper mechanism can be obtained by a comparatively simple constitution.

The invention relating to Claim 6 is characterized by the following elements on the basis of the folding outer mirror as described in Claim 1. That is, in the folding outer mirror comprising the mirror base extending outside from the side surface of vehicle body and the mirror assembly attached rotatably to the mirror base, the mirror base is provided with the base-side arcuate groove having the same center as a rotation center thereof, the mirror assembly is provided with the body-side convex part inserted in the base-side arcuate groove, the mirror assembly is provided with the body-side arcuate groove having the same center as a rotation center thereof, and the mirror base is provided with the base-side convex part inserted in the body-side arcuate groove. Furthermore, the base-side engaging surface is constituted at a circumferential end surface of the base-side arcuate groove and an end surface in a rotating direction of the mirror assembly of the base-side convex part, the body-side engaging surface is constituted at an end surface in a rotating direction of the body-side convex part and a circumferential end surface of the body-side arcuate groove. Then, when the mirror assembly is positioned at a rearward folded position or a forward retracted position, the body-side convex part is in contact with the circumferential end surface of the base-side arcuate groove, and the base-side convex part is in contact with the circumferential end surface of the body-side arcuate groove.

In such a constitution, as the body-side convex part is in contact with a circumferential end of the base-side arcuate groove and the base-side convex part is in contact with a circumferential end of the body-side arcuate groove, the contact area between the convex part and the arcuate groove can be made to be larger. Accordingly, as the outside force urged to the mirror assembly is dispersed at the convex part and the arcuate groove, the higher stiffness of the stopper mechanism composing of the convex part and the arcuate groove can be obtained without using high-intensity materials, and the cost reduction thereof can be obtained. As the convex part is not required to be large as its single unit, large sizes of the stopper mechanism composing of the convex part and the arcuate groove can be prevented, and heavy weights thereof can be also prevented.

The invention relating to Claim 7 is characterized by the following elements on the basis of the folding outer mirror as described in Claim 6. That is, at least one of a combination of the body-side convex part and the base-side arcuate groove and a combination of the base-side convex part and the body-side arcuate groove are provided as a plurality of combinations.

In such a constitution, as the contact area between the convex part and the arcuate groove can be made to be larger, still further higher stiffness of the stopper mechanism can be obtained.

The invention relating to Claim 8 is characterized by the following element on the basis of the folding outer mirror as described in Claim 7. That is, at least one of the body-side convex part and the base-side convex part is integrally provided with the stiffening rib extending in a circumferential direction.

In such a constitution, as the stiffness of the convex part itself as a single unit is made to be higher, the further higher stiffness of the stopper mechanism can be obtained.

According to the present invention, it is effective and advantageous to provide a folding outer mirror in which the cost reduction, the prevention of large sizes and heavy weights, and the higher stiffness of the stopper mechanism can be obtained.

BRIEF DESCRIPTION OF THE INVENTION

FIG. 2A is a plan view showing a positional relationship between each convex part and each arcuate groove in a normal position of the mirror assembly of the folding outer mirror relating to the first embodiment of the present invention. FIG. 2B is a developed view in section taken along a line ii-ii in FIG. 2A.

Figure 3A:
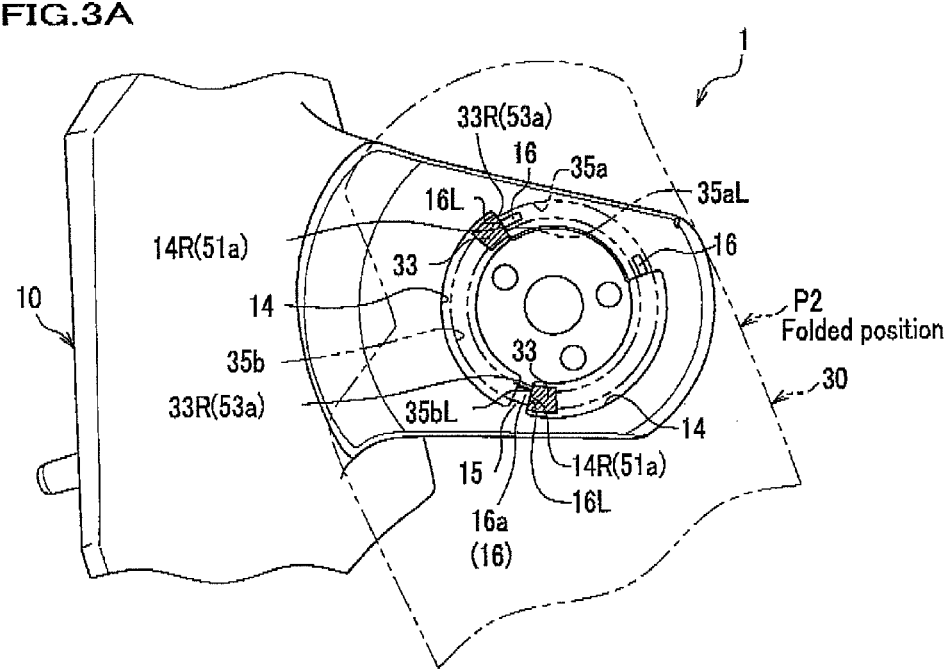
Figure 3B:
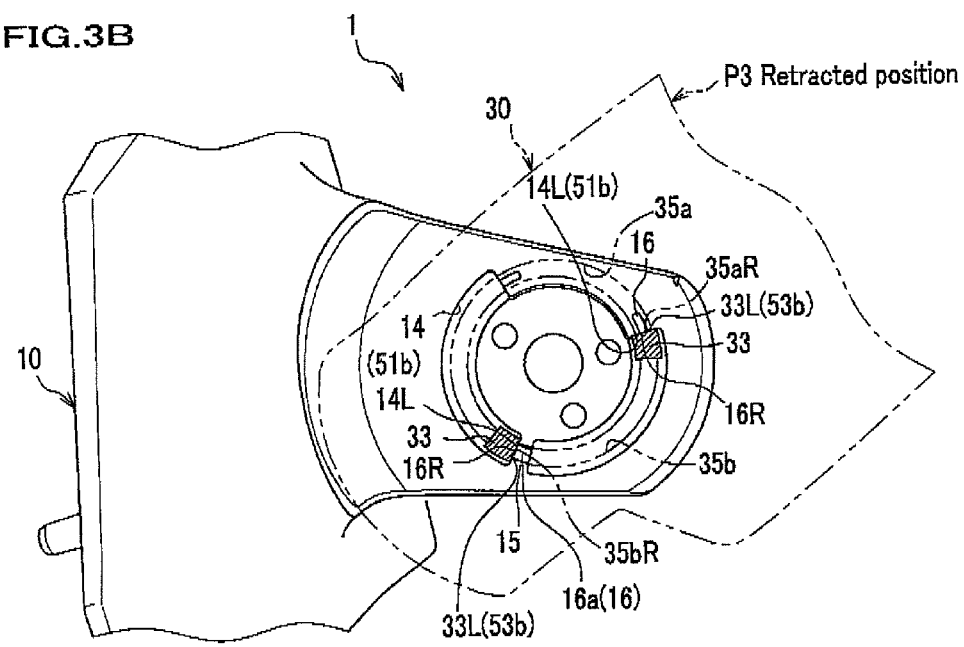

FIGS. 3A and 3B are views showing the folding outer mirror relating to the first embodiment of the present invention. FIG. 8A is a plan view showing a positional relationship between each convex part and each arcuate groove in a folded position of the mirror assembly. FIG. 3B is a plan view showing a positional relationship between each convex part and each arcuate groove in a retracted position of the mirror assembly.

Figure 4:
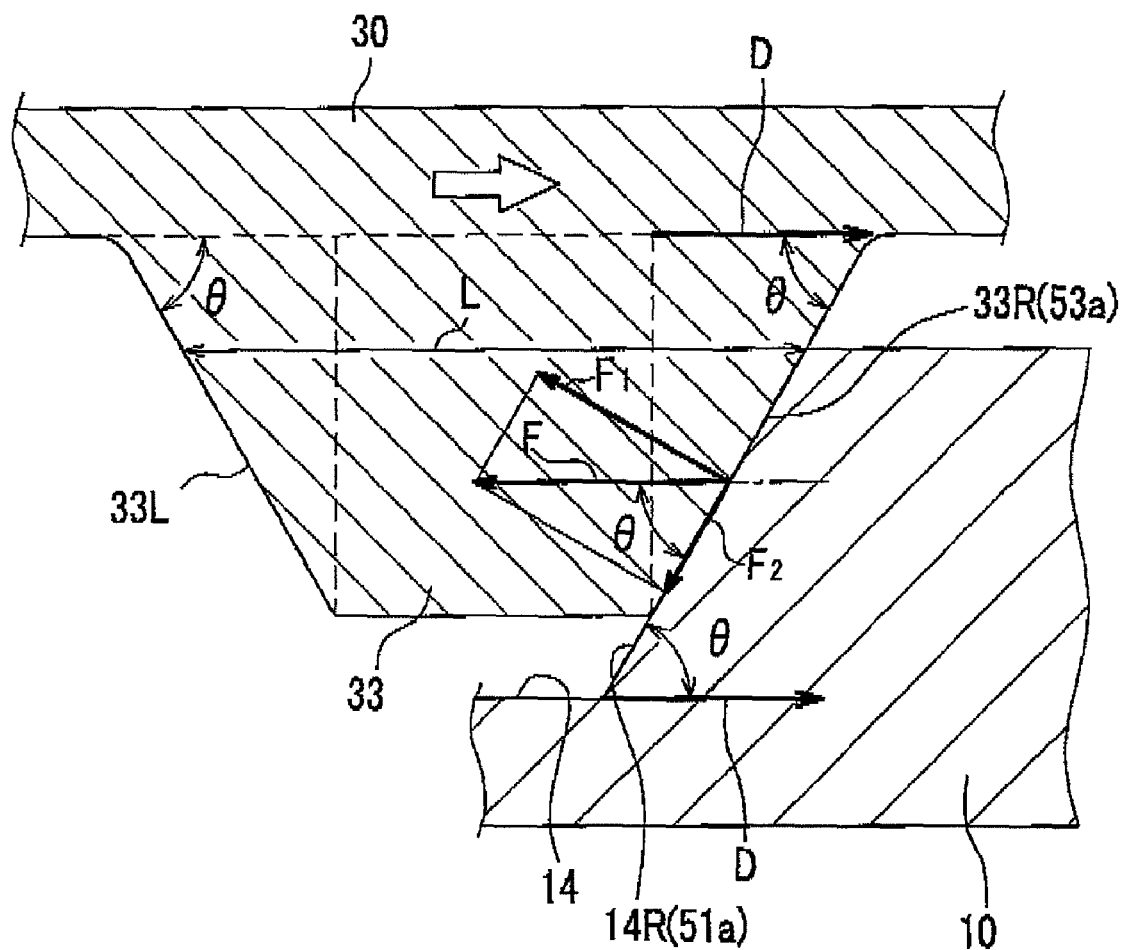

FIG. 4 is a sectional view showing a contact condition between a body-side convex part and a base-side arcuate groove of the folding outer mirror relating to the present invention.

Figure 5A:
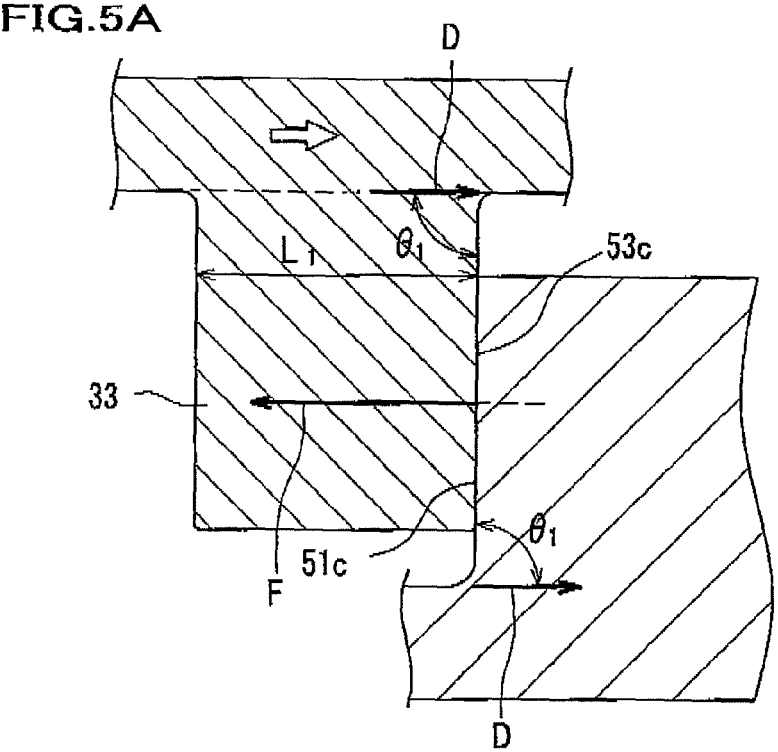
Figure 5B:
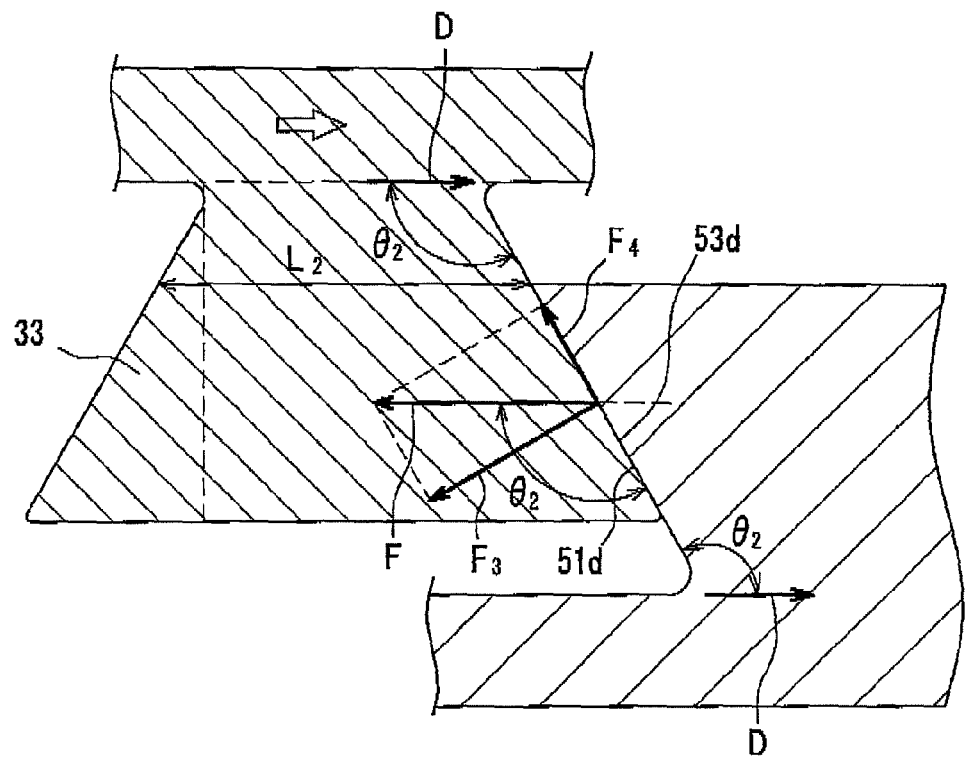

FIGS. 5A and 5B are views showing a comparative example of the contact condition between the body-side convex part and the base-side arcuate groove of the folding outer mirror relating to the present invention. FIG. 5A is a sectional view showing a sectional view in case of a right-angled condition of the raising angle. FIG. 5B is a sectional view showing in case of an obtuse angle of the raising angle.

Figure 6:
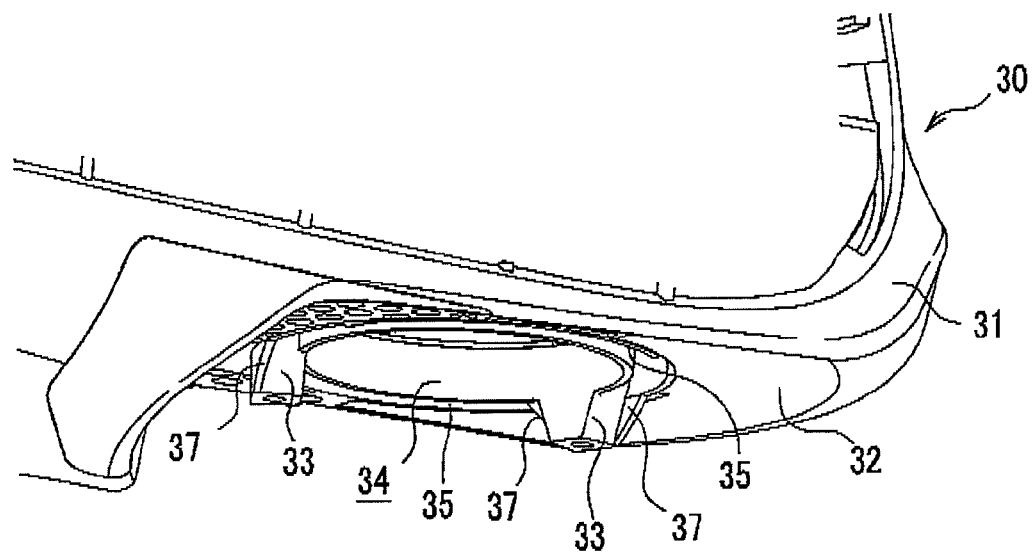

FIG. 6 is a perspective view showing the other form of the body-side convex part.

Figure 7:
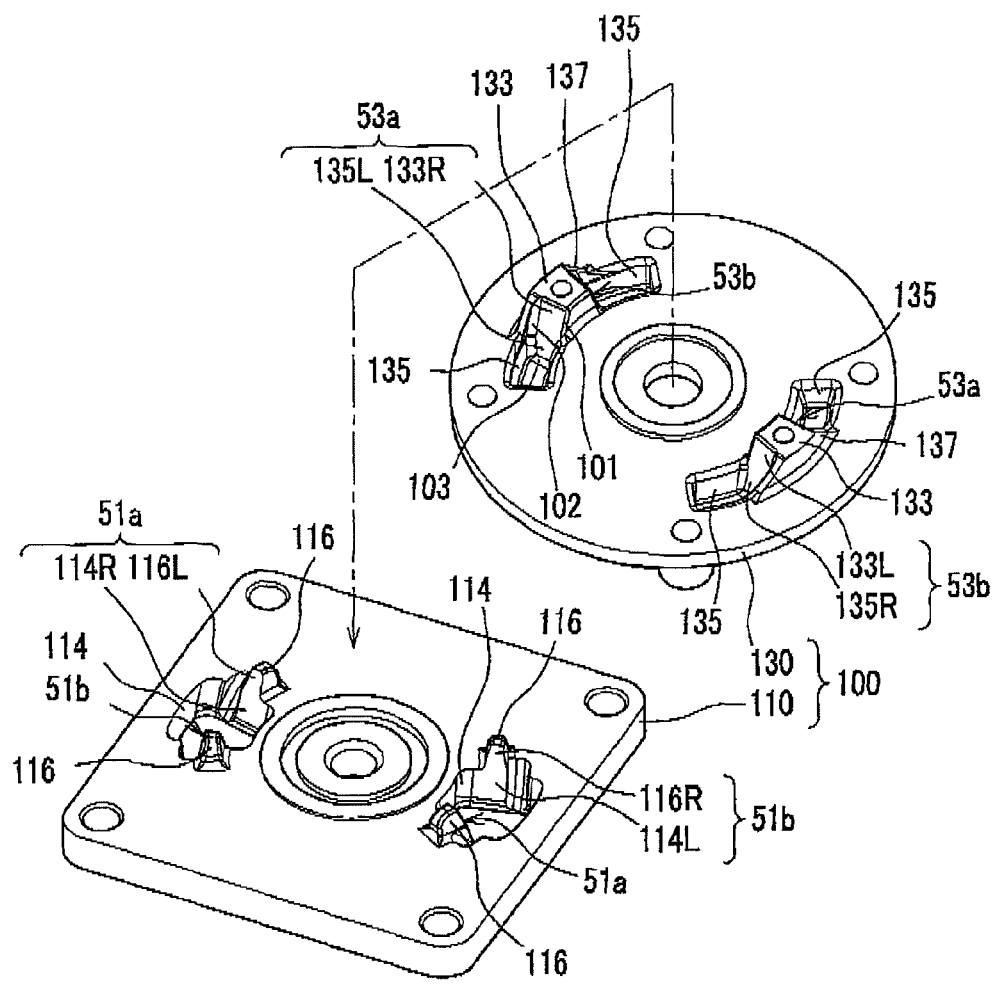

FIG. 7 is a perspective view showing a FEM analysis model.

Figure 8:
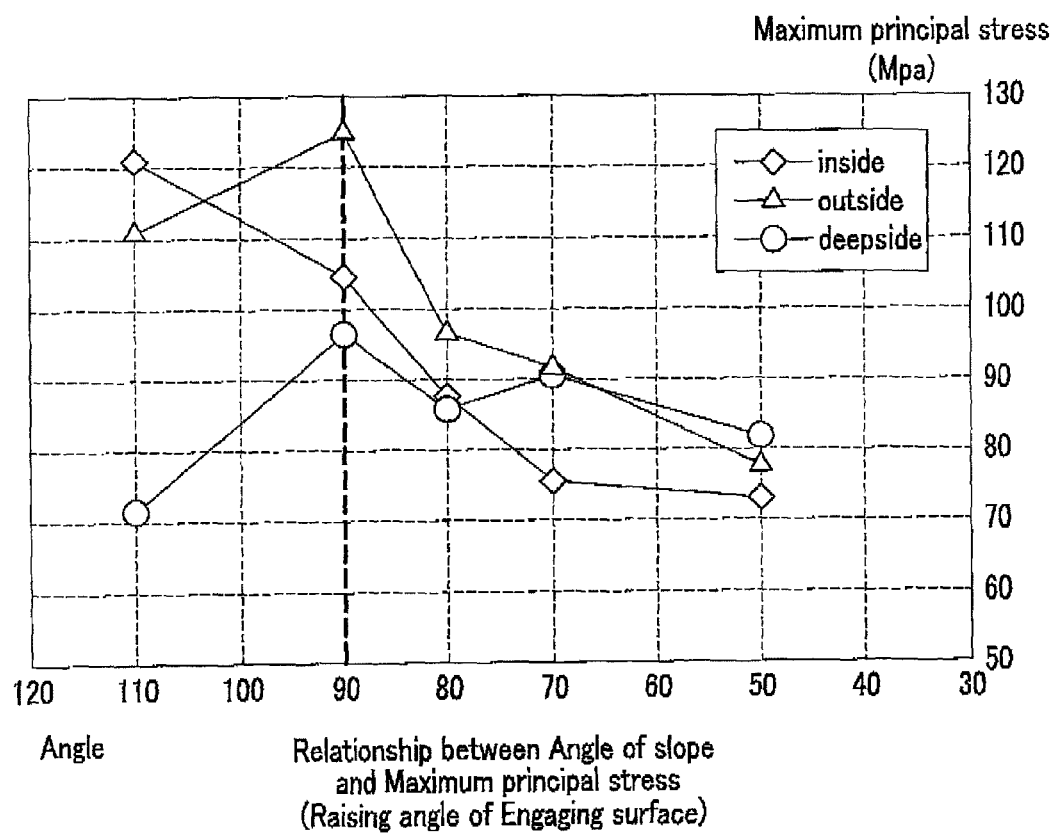

FIG. 8 is a graph showing a relationship between the raising angle and a maximum principal stress.

FIGS. 9A, 9B and 9C are graphs showing a relationship between the raising angle and maximum principal stress influenced by depending on being with or without a stiffened rib. FIG. 9A is a graph showing an inside condition of the engaging surface, FIG. 9B is a graph showing an outside condition of the engaging surface, and FIG. 9C is a graph showing a deepside condition of the engaging surface.

FIGS. 10A and 10B are graphs showing a relationship between the raising angle and the raising force of body. FIG. 10A is a graph showing the folding torque in case of 60 Nm. FIG. 10B is a graph showing the folding torque in case of 30 Nm.

Figure 11:
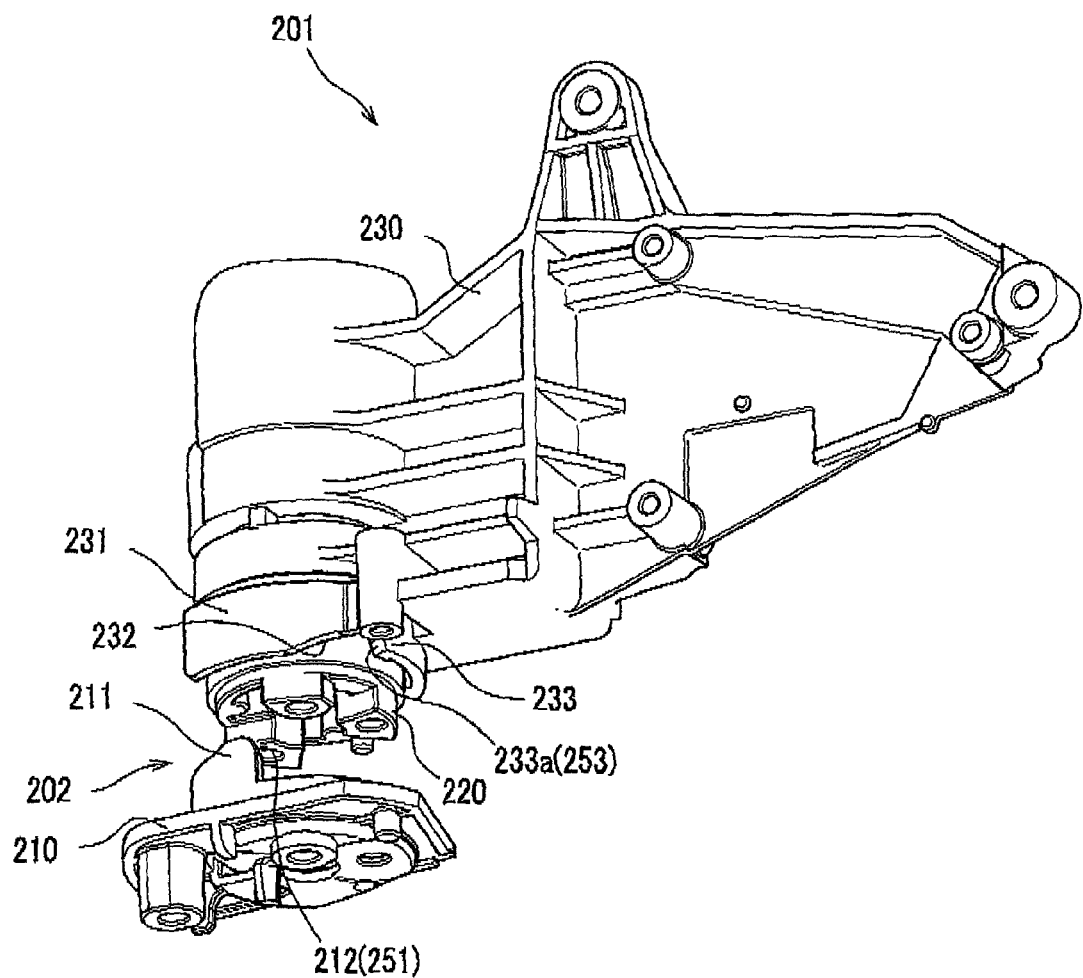

FIG. 11 is an exploded perspective view showing a folding outer mirror relating to a second embodiment of the present invention.

Figure 12A:
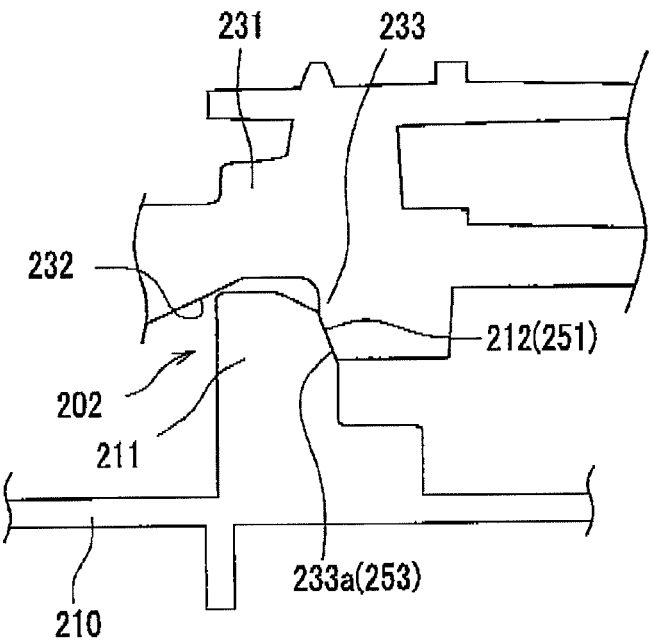
Figure 12B:
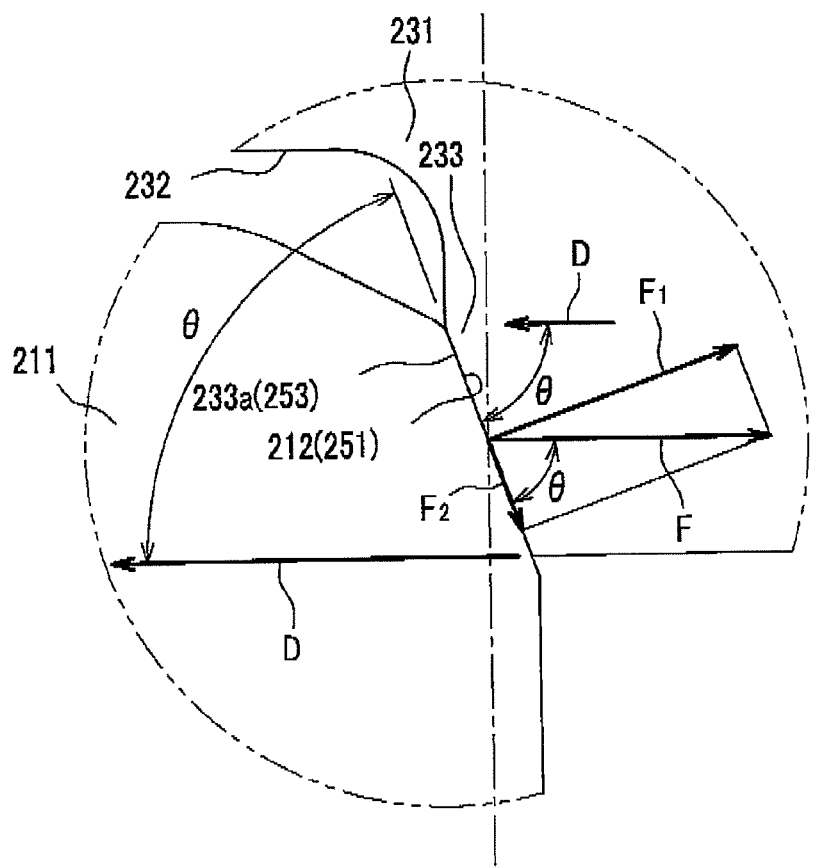

FIG. 12A is a side view showing the body-side engaging surface and the base-side engaging surface of the folding outer mirror relating to the second embodiment of the present invention. FIG. 12B is a substantial enlarged side view.

Figure 13:
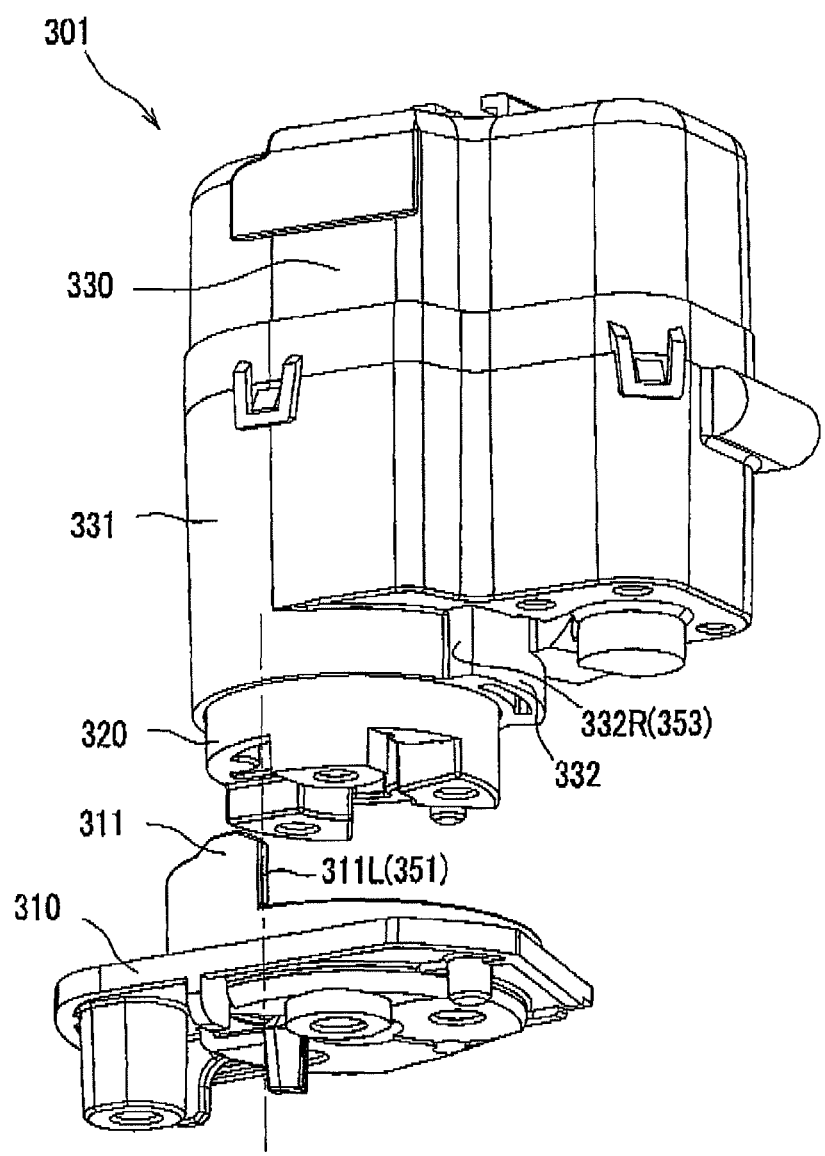

FIG. 13 is an exploded perspective view showing a folding outer mirror relating to a third embodiment of the present invention.

Figure 14A:
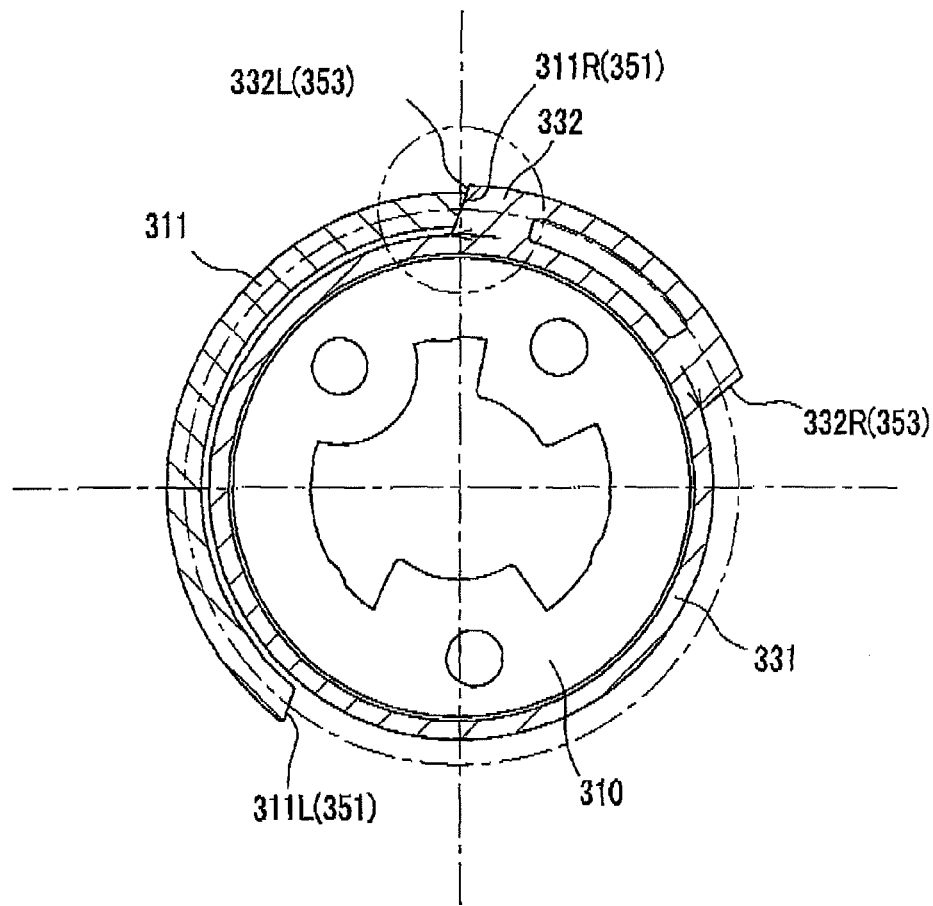
Figure 14B:
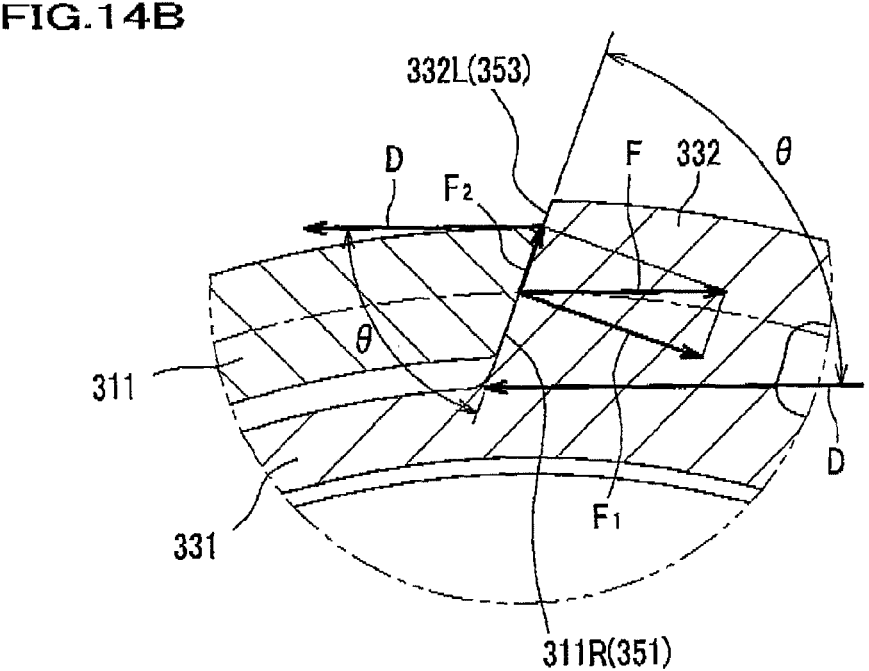

FIG. 14A is a sectional view showing the body-side engaging surface and the base-side engaging surface relating to the third embodiment of the present invention. FIG. 14B is a substantial enlarged sectional view.

DETAILED DESCRIPTION OF THE INVENTION

A first embodiment of a folding outer mirror relating to the present invention will be described in detail with respect to the attached drawings. In this embodiment, it will be given an example of an electric folding outer mirror, which is adapted to rotate the mirror assembly with electricity.

Figure 1:
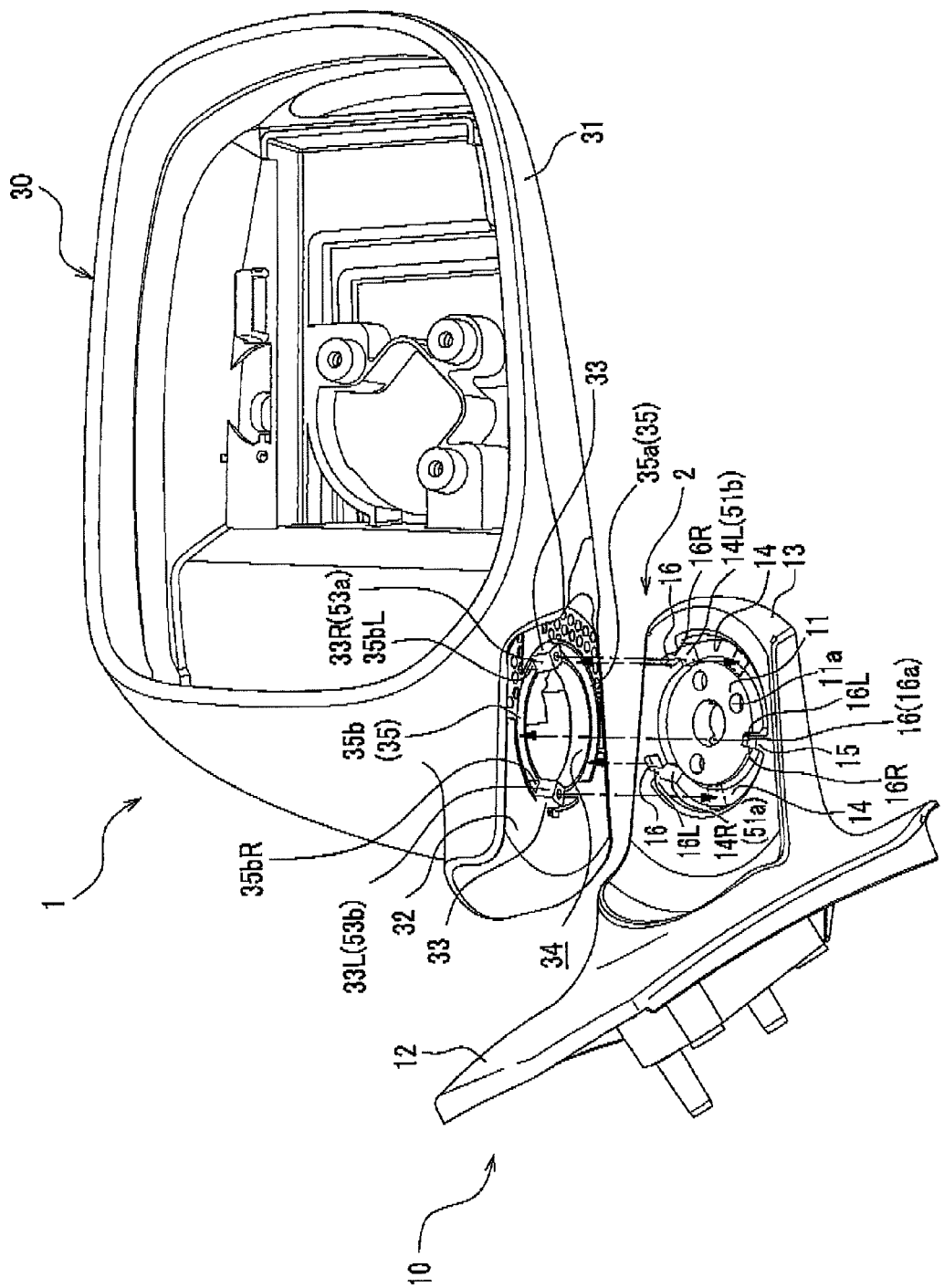
FIG. 1 is an exploded perspective view showing a folding outer mirror relating to a first embodiment of the present invention.

As shown in FIG. 1, the folding outer mirror 1 relating to this embodiment is provided with a mirror base 10 extending from the side surface of vehicle body (as not shown) toward the side and a mirror assembly 30 as been rotatably attached to the mirror base 10. The mirror assembly 30 is constituted such that a mirror as not shown, a holder (as not shown) holding the mirror, a frame (as not shown) holding the holder slantably, and an electric folding outer mirror (as not shown) rotating the mirror assembly 30 are housed in the mirror housing 31.

The electric folding outer mirror is provided with a shaft (as not shown) extending in an appropriately up-and-down direction and a motor (as not shown) rotating the mirror assembly 30 around the shaft. The shaft is attached to a mounting seat of the mirror base 10 at its lower extremity. The mirror assembly 30 is adapted to rotate between a normal position P1 (as shown in FIG. 2) as developed outside and a folded position P2 (as shown in FIG. 3A) as folded inside by rotating around the shaft through various gears (as not shown). The folding outer mirror 1 is constituted to have a forward retracted position P3 (as shown in FIG. 3B) so as to retract the mirror assembly 30 by forward rotations in preparation for outside forces such as unexpected crash or contact from the rear side of a vehicle body.

The mirror base 10 is provided with a mounting plate 12 fixed in a mounting seat (as not shown) formed in a pillar portion or the like positioned in a side door of vehicle body and a base body 13 extending from the lower part of the mounting plate 12 toward a side direction. The mounting plate 12 and the base body 13 are integrally constituted by synthetic plastic or the like. The mounting seat 11 of the shaft of an electric folding unit is formed on the base body 13. The mounting seat 11 is formed to have a plurality of bolt holes 11a. Then, a bolt (as not shown) is screwed on a boss of shaft through the bolt hole 11a from the lower part of the base body 13, then to fix the shaft therein.

A crutch mechanism (as not shown) is provided between the shaft and the frame. The crutch mechanism is designed to position the mirror assembly 30 between the normal position P1 (as referred to FIG. 2) and the folded position P2 (as referred to FIG. 3A) by regulating the rotation thereof. Also, the crutch mechanism is designed to accept the rotation to the retracted position P3 (as referred to FIG. 3B) of the mirror assembly 30 at the time when outside forces such as unexpected crash or contact is urged from the rear side of vehicle body.

The folding outer mirror 1 is provided with a stopper mechanism 2 for stopping the mirror assembly 30 at the folded position P2 or the retracted position P3 when the mirror assembly 30 rotates from the normal position P1 to the rearward folded position P2 or the retracted position P3.

The stopper mechanism 2 is provided with base-side engaging surfaces 51a, 51b formed in the mirror base 10 and body-side engaging surfaces 53a, 53b being in a plane contact with the base-side engaging surfaces 51a, 51b at the predetermined position (the folded position P2 or the retracted position P3) formed in the mirror assembly 30. In the folded position P2, the base-side engaging surface 51a and the body-side engaging surface 53b are in plane contact with each other in a plane. In the retracted position P3, the base-side engaging surface 51b and the body-side engaging surface 53b are in contact with each other. The base-side engaging surfaces 51a, 51b and the body-side engaging surfaces 53a, 53b are constituted such that the raising angles thereof become an acute angle (as referred to FIG. 4) relative to a rotating direction D of the mirror assembly 30. The rotating direction D means a tangential direction at any point of rotational circumferential direction in the above. The raising angle θ is an angle raising an engaging surface from the side of the mirror base 10 or the mirror assembly 30 toward the other side on the basis of rotating direction, and means an angle in the solid side of the engaging surface relative to the rotating direction D.

In this embodiment, the stopper mechanism 2 is constituted that the base-side arcuate groove 14 is coaxially formed to have the same center as a rotation center of the mirror assembly 30 in the mirror base 10 and the body-side convex part 33 inserted into the mirror assembly 30 is provided in the base-side arcuate groove 14. The body-side arcuate groove 35 is formed in the mirror assembly 30 in the same rotation center as the mirror assembly 30. The base-side convex part 16 inserted into the body-side arcuate groove 35 is provided in the mirror base 10. When the mirror assembly 30 is at the rearward folded position P2 or the forward retracted position P3, the body-side convex part 33 is adapted to be in contact with the circumferential end 14R (at a position of the folded position P2) or 14L (at a position of the retracted position P3) of the base-side arcuate groove 14. The base-side convex part 16 is in contact with the circumferential end 35aL (35bL) (at a folded position P2) or 35aR (35bR) (at a retracted position P3) of the body-side arcuate groove 35. As later described, the right end surface 33R and the left end surface 33L, as being surfaces of the both ends of the body-side convex part 33, is slantingly formed such that the raising angle θ becomes an acute angle. The circumferential end 14R or 14L of the base-side arcuate groove 14, as being in contact with the circumferential end surface 33R, 33L of the body-side convex part 33, is slantingly formed such that the raising angle θ becomes an arcuate angle. The left end surface 33L of the body-side convex part 33 is constituted to be the body-side engaging surface 53b and the circumferential end 14L of the base-side arcuate groove 14 is constituted to be the base-side engaging surface 51b. The right end surface 33R of the body-side convex part 33 is constituted to be the body-side engaging surface 53a and the circumferential end 14R of the base-side arcuate groove 14 is constituted to be the base-side engaging surface 51a.

Hereinafter, a constitution of the stopper mechanism 2 will be described in detail. As shown in FIGS. 1 and 2, the base-side arcuate groove 14 is formed in the surrounding of the mounting seat 11 arranged on the upper surface of the base body 13 of the mirror base 10. The base-side arcuate groove 14 is coaxially formed in a center of the shaft, that is, a rotation center of the mirror assembly 30. The base-side arcuate groove 14 is farmed at two positions on the concentric circle. Each of the base-side arcuate grooves 14, 14 is arranged to grasp an intermediate portion 15 to form the predetermined narrow central angle therebetween. Both are mutually formed not to interfere with each other. As shown in FIG. 2, the base-side arcuate groove 14 is constituted to have a central angle composed of a rotation angle A (the rearward folding angle) ranging from a normal position P1 to a folded position P2 (as referred to FIG. 3A), a rotation angle B (the forward folding angle) ranging from a normal position P1 to a retracted position P3 (as referred to FIG. 3B), and a rotation angle C equivalent to a circumferential length of the body-side convex part 33 (a length in the rotating direction of the mirror assembly 30) as described later. In this embodiment, the central angle of the base-side arcuate groove 14 is a little smaller than 120 degrees.

As shown in FIG. 1, a through hole 34 for inserting the shaft is formed on the lower surface 32 opposite to the mounting seat 11 of the mirror housing 31 of the mirror assembly 30. The through hole 34 has the same circular form as the mounting seat 11. The body-side convex part 33 as inserted into the base-side arcuate groove 14 is provided in the surrounding of the through hole 34. The body-side convex part 33 is constituted to extend from the lower surface 32 of the mirror housing 31 to the lower side. Two body-side convex parts 33 is coaxially provided and each of the body-side convex part 33, 33 is inserted into each of two base-side arcuate groove 14, 14. The body-side convex part 33 is constituted by the same material such as synthetic plastics to be integrally formed with the mirror housing 31.

As shown in FIG. 2A, when the mirror assembly 30 is positioned at a normal position P1, the right end surface 33R (as referred to FIG. 2B) (hereinafter, a left-and-right direction in this specification is a standard direction as seen from the rotation center at a condition assembling the mirror assembly 30 and the mirror base 10) as seen from the rotation center of the body-side convex part 33 is adapted to be a position spaced by a rotation angle A between the normal position P1 and the folded position P2 from the right end surface 14R of the base-side arcuate groove 14. At this time, the left end surface 33L (as referred to FIG. 2B) of the base-side arcuate groove 33 is positioned at a separated position by a rotation angle B ranging between the normal position P1 and the retracted position P3 from the left end surface 14L of the base-side arcuate groove 14.

As shown in FIG. 1, FIG. 2B, and FIG. 4, the body-side convex part 33 is slantingly formed as the body-side convex part 33 such that the right end surface 33R and the left end surface 83L, as being circumferential both ends, mutually approaches at the side of their lower extremity. The right end surface 33R as being circumferential end surface of the body-side convex part 33 is constituted to be the body-side engaging surface 53b and the left end surface 33L is constituted to be the body-side engaging surface 53a. The slanting angles (the raising angle θ relative to the rotating direction D) of the end surfaces 33R, 33L are respectively equal and the right end surface 33R and the left end surface 33L are mutually constituted in a shape of plane symmetry such that a line connecting between lower ends (lower extremities) of end surfaces 33R, 33L constitutes a short side of isosceles trapezoid in section (as referred to FIG. 4). Although the body-side convex part 33 is formed like a solid form, it is not limited thereto. It may be formed like being a hollow form by emptying the internal portion thereof. In this way, light weight and cost reduction of the mirror assembly 30 can be obtained. In FIGS. 2 and 3, the section of the body-side convex part 33 as shown by hatchings shows a base and a horizontal section in a long side of trapezoid.

The right end surface 14R of the base-side arcuate groove 14 (as referred to FIG. 2) slants at the same slanting angle (the raising angle θ relative to the rotating direction) as the right end surface 33R of the body-side convex part 33. As shown in FIG. 3A, when the mirror assembly 30 is at a folded position P2, the right end surface 14R of the base-side arcuate groove 14 and the right end surface 33R of the body-side convex part 33 are mutually contacted in plane. The left end surface 14L (as referred to FIG. 2B) of the base-side arcuate groove 14 slants at the same slanting angle as the left end surface 331, of the body-side convex part 33. As shown in FIG. 3B, when the mirror assembly 30 is at the retracted position P3, the left end surface 14L of the base-side arcuate groove 14 and the left end surface 33L of the body-side convex part 83 are in contact with each other.

The body-side convex part 33 and the base-side arcuate groove 14 are constituted as a combination (a combination of stoppers). The combination of stoppers is formed as two combinations.

As shown in FIG. 1 and FIG. 2A, 2B, a pair of base-side convex parts 16, 16 extending in the side of the mirror assembly 30 is formed on an upper surface of the base body 13 positioned at both ends in a circumferential direction of the base-side arcuate groove 14. The base-side convex part 16 is inserted into the body-side arcuate groove 35 as later described. The base-side convex part 16 is constituted by the same material such as synthetic plastics to be integrally formed with the mirror base 10. The base-side convex part 16 (hereinafter, it may be referred to as "base-side convex part 16a") formed in the intermediate part 15 positioned between the neighboring base-side arcuate grooves 14, 14 is used as both the left end of one base-side arcuate groove 14 and the right end of the other base-side arcuate groove 14. The base-side convex parts 16 are formed at three positions, that is, the right end of one base-side arcuate groove 14, the left end thereof (also use of the right end of the other base-side arcuate groove 14), and the left end of the other base-side arcuate groove 14. These three base-side convex parts 16, 16a, 16 are formed in an equal pitch at the central angle of 120 degrees from the rotation center. The base-side convex part 16a for both uses thereof is constituted that the both circumferential ends are opposed to a pair of base-side arcuate grooves 14, 14, and the other base-side convex parts 16, 16 are constituted that the only one circumferential end is opposed to the base-side arcuate groove 14, 14.

In the base-side convex part 16a formed in an intermediate part positioning between the neighboring base-side arcuate grooves 14, 14, both of the circumferential end surfaces 16R, 16L slant at the same slanting angle as the left end surface 14L and the right end surface 14R of the base-side convex part 16a respectively. As a result, the circumferential end surface 16L of the base-side convex part 16a and the right end surface 14R of the base-side arcuate groove 14 lie on a same plane, and the circumferential end surface 16R of the base-side convex part 16a and the right end surface 14R of the base-side arcuate groove 14 lie on a same plane. In the base-side convex part 16 (as shown in a middle and a left side of FIG. 2B) positioned at one end of the base-side arcuate groove 14 and at the opposite end of the intermediate part 15, the circumferential end surface 16R positioned in the side of the base-side arcuate groove 14 slants at the same slanting angle as the left end surface 14L of the base-side arcuate groove 14. As a result, the circumferential end surface 16R of the base-side arcuate groove 14 and the left end surface 14L of the base-side arcuate groove 14 lie on a same plane. The circumferential end surface in the reverse side of the circumferential end surface 16R is formed to be orthogonal to an upper surface of the base body 18 and to extend a vertical direction. In the base-side convex part 16 (as shown in a middle and a right side of FIG. 2B) positioned at the other base-side arcuate groove 14 and at the opposite end of the intermediate part 15, the circumferential end surface 16L positioned in the side of the base-side arcuate groove 14 slants at the same angle as the left end surface 14R of the base-side arcuate groove 14. As a result, the circumferential end surface 16L of the base-side arcuate groove 14 and the right end surface 14R of the base-side arcuate groove 14 lie on a same plane. The circumferential end surface in the reverse side of the circumferential end surface 16L is formed to be orthogonal to an upper surface of the base body 13 and to extend a vertical direction.

The body-side arcuate groove 35 for inserting the base-side convex part 16 is formed in the surrounding of the through hole 34 of the mirror housing 31 of the mirror assembly 30. The body-side arcuate groove 35 is formed to range like an arcuate curve between two body-side convex parts 33, 33 at a narrow side and a wide side of central angle thereof. That is, the body-side arcuate groove 35 is constituted by the body-side arcuate groove 35a, 35b, which are respectively long and short in the arcuate curves. Then, the body-side arcuate grooves 35a, 35b and the body-side convex parts 33, 33 are constituted to form a circle, of which center is a center of rotation of the mirror assembly 30. The base-side convex part 16a having both use (the base-side convex part 16a of which the circumferential both ends are opposite to the base-side arcuate grooves 14, 14) formed in the intermediate part 15 is inserted in the body-side arcuate groove 35b as being short in the arcuate curve, and the two base-side convex parts 16, of which only one of the circumferential ends is opposed to the base-side arcuate groove 14, are inserted in the body-side arcuate groove 35a as being long in the arcuate curve. A pair of the base-side convex parts 16, 16 positioned at both ends of the base-side arcuate groove 14 are inserted in the body-side arcuate groove 35a as being long in the arcuate curve and the body-side arcuate groove 35b respectively. A pair of the base-side convex parts 16, 16 and a pair of the body-side arcuate grooves 35a, 35b are adapted to constitute one combination (a stopper set). In this embodiment, two sets of stopper sets are constituted.

As shown in FIG. 2B, the circumferential end surfaces 35aL, 35bL of the body-side arcuate grooves 35a, 35b slant at the same slanting angle as the right end surface 33R of each body-side convex part 33 respectively. As a result, the circumferential end surfaces 35aL, 35bL of each body-side arcuate grooves 85a, 35b and the right end surfaces 33R, 38R of each body-side convex part 33 lie on a same plane. The circumferential end surfaces 35aR, 35bR of each body-side arcuate grooves 35a, 85b slant at the same slanting angle as the left end surface 33L of each body-side convex part 33. As a result, the circumferential end surfaces 35aR, 35bR of each body-side arcuate grooves 35a, 35b and the left end surface 33L, 33L of each body-side convex part 33 lie on a same plane.

As shown in FIG. 2A, when the mirror assembly 30 is positioned at a normal position P1, the left end surface 35aL of the body-side arcuate groove 35a as being long in the arcuate curve (as referred to FIG. 2B) is positioned at a position spaced by the rotation angle A ranging between the normal position P1 and the folded position P2 from the left end surface 16L of one base-side convex part 16 (as referred to FIG. 2B), which only one end of the circumferential ends is opposed to the base-side arcuate groove 14. At this time, the right end surface 35aR of the body-side arcuate groove 35a (as referred to FIG. 2B) as being long in the arcuate curve is positioned at a position spaced by the rotation angle B ranging between the normal position P1 and the retracted position P3 from the right end surface 16R of the other base-side convex part 16 (as referred to FIG. 2B), which only one end of the circumferential ends is opposed to the base-side arcuate groove 14.

When the mirror assembly 30 is positioned at the normal position P1, the left end surface 35bL of the body-side arcuate groove 35b as being short in the arcuate curve is positioned at a position spaced by the rotation angle A ranging between the normal position P1 and the folded position P2 from the left end surface 16L of one base-side convex part 16 (as referred to FIG. 2B) having two functions, which only one end of the circumferential ends is opposed to the base-side arcuate groove 14. At this time, the right end surface 35bR of the body-side arcuate groove 35b as being short in the arcuate curve is positioned at a position spacing away the rotation angle B ranging between the normal position 21 and the retracted position 23 from the right end surface 16R of the base-side convex part 16 having two functions.

According to the embodiment as above mentioned, both a combination of the body-side convex part 33 and the base-side arcuate groove 14, and a combination of the base-side convex part 16 and the body-side arcuate groove 35 are respectively provided to have two sets to form a stopper mechanism 2.

Next, movements of each part of the folding outer mirror 1 as constituted like the above will be described. As shown in FIG. 3A, when the mirror assembly 30 rotates to the folded position P2, the right end surface 33R of the body-side convex part 33 (body-side engaging surface 53a) contacts the right end surface 14R of the base-side arcuate groove 14 (base-side engaging surface 51a) and the left end surface 35bL of the body-side arcuate groove 35b as being long in the arcuate curve contacts the left end surface 16L of one base-side convex part 16, which only one end of the circumferential ends is opposed to the base-side arcuate groove 14. In this embodiment, both a combination of the body-side convex part 33 and the base-side arcuate groove 14, and a combination of the base-side convex part 16 and the body-side arcuate groove 35 are respectively provided to have two sets. Thus, the right end surface 33R of the another pair of body-side convex part 33 (body-side engaging surface 53a) contacts the right end surface 14R of the base-side arcuate groove 14 ((base-side engaging surface 51a), and the left end surface 35aL of the body-side arcuate groove 35a as being short in the arcuate curve contacts the left end surface 16L of the base-side convex part 16 having both functions.

Next, movements of each part of the folding outer mirror 1 as constituted like the above will be described. As shown in FIG. 3B, when the mirror assembly 30 rotates to the retracted position P3, the left end surface 33L of the body-side convex part 33 (body-side engaging surface 53b) contacts the left end surface 14L of the base-side arcuate groove 14 (base-side engaging surface 51b) and the right end surface 35bR of the body-side arcuate groove 35b as being long in the arcuate curve contacts the left end surface 16L of one base-side convex part 16, which only one end of the circumferential ends is opposed to the base-side arcuate groove 14. In this embodiment, both a combination of the body-side convex part 33 and the base-side arcuate groove 14, and a combination of the base-side convex part 16 and the body-side arcuate groove 35 are respectively provided to have two sets. Thus, the left end surface 33L of the another pair of body-side convex part 33 (body-side engaging surface 53b) contacts the left end surface 14L of the base-side arcuate groove 14 ((base-side engaging surface 51a), and the left end surface 35aR of the body-side arcuate groove 35a as being short in the arcuate curve contacts the right end surface 16R of the base-side convex part 16 having both functions.

As above mentioned, according to this embodiment, the circumferential ends 33R, 33L (body-side engaging surfaces 53a, 53b) of the body-side convex part 33 are constituted to slant such that the raising angle relative to the rotating direction D of the mirror assembly 30 becomes an acute angle, the circumferential ends 14R, 14L (base-side engaging surface 51a, 51b) of the base-side arcuate groove 14 are constituted to slant such that the raising angle relative to the rotating direction D of the mirror assembly 30 becomes an acute angle. Then, the stiffness of the stopper mechanism 2 can be improved to enhance. This is based on the following reason.

As shown in FIG. 4, when the right end surface 33R of the body-side convex part 33 contacts the right end surface 14R of the base-side arcuate groove 14, the outside force urged to the body-side convex part 33 is divided into a force acting directly on plane $F1=F \cdot \sin \theta$ perpendicular to the right end surface 33R of the body-side convex part 33, and a separate force in the slipping direction $F2=F \cdot \cos \theta$. The force acting directly on plane F1 urged to the right end surface 33R of the body-side convex part 33 becomes smaller than the outside force F, and the end surface of the contact area is larger than one in case of a right angle. Then, the plane pressure in the contact surface becomes small, and functions toward an advantageous direction relative to a stiffness of the body-side convex part 33. As a shearing length L of the body-side convex part 33 becomes longer than one in case of a right angle, the shearing intensity of the body-side convex part 33 becomes stronger. As an angle of the base part of the body-side convex part 33 becomes an obtuse angle, and a stress concentration coefficient can be greatly improved and prevented a concentration of stress. The stress concentration coefficient can be improved in case of a thick base part. When the arising angle $\theta$ relative to a horizontal plane of the circumferential end 33L, 33R of the body-side convex part 33 is small, the force running on along the right end surface 14R or the left end surface (as not shown) of the base-side arcuate groove 14 becomes large. In this case, the slanting angle $\theta$ is designed to set a larger value than the predetermined angle, at which the body-side convex part 33 does not run on relative to the right end surface 14R or left end surface (as not shown). In such a constitution, the mirror assembly 30 is definitely engaged at the predetermined position (a folded position P2 or retracted position P3), and never runs on the base member 13.

The above embodiment will be compared with a case where the raising angles of the base-side engaging surface and the body-side engaging surface are a right angle or an obtuse angle respectively.

As shown in FIG. 5A, when the raising angle $0_1$ relative to a rotating direction D of the base-side engaging surface 51c and the body-side engaging surface 53c is a right angle, the body-side engaging surface 53c of the body-side convex part 33 receives an outside force F directly. Then, the force in this case is larger than one of the above embodiment, and the contact area is smaller than one of the above embodiment. Accordingly, this contact pressure of the abutting surface is larger than one of this embodiment. As a length L1 of the shearing force of the body-side convex part 33 is shorter than one of this embodiment, a shearing intensity of the body-side convex part 33 makes stronger. As a result, this embodiment is understood to be higher in stiffness than a case where the raising angle $0_1$ of each engaging surface 51c, 53c is a right angle.

As shown in FIG. 5B, when the raising angle $\theta_2$ relative to a rotating direction D of the base-side engaging surface 51 and the body-side engaging surface 53d is an obtuse angle, the body-side engaging surface 53d of the body-side convex part 33 receives an outside force F separated into a direct contact pressure $F_3=F \cdot \sin \theta_2$ perpendicular to the body-side engaging surface 53d and a separate force $F_4=F \cdot \cos 0_2$ in a slipping direction. The direct contact pressure F3 as received on the body-side engaging surface 53d of the body-side convex part 33 is smaller than an outside force F, and the contact area is larger than one of the case where the end surface thereof is a right angle. Thus, the contact pressure of the contact area becomes smaller, and functions to be an advantageous side relative to a stiffness of the body-side convex part 33. As a length of shearing force of the body-side convex part 33 becomes larger than one of the case where the end surface thereof is a right angle, the shearing intensity of the body-side convex part 33 becomes stronger. Then, it functions to be an advantageous side relative to a stiffness of the body-side convex part 33, even in a case where the raising angle $\theta_2$ is an obtuse angle. However, as an angle of the base of the body-side convex part 33 becomes an obtuse angle, it results in a concentration of the stress and a worse stress concentration coefficient caused by a thinner base. As above mentioned, the above embodiment is understood to be higher in stiffness than the case where the raising angle $\theta_2$ of each engaging surface 51c, 53c is an obtuse angle.

Furthermore, compared with a case where a contact area between the convex part and the arcuate groove is one spot, the abutting part can be greatly increasing and the contact area can be larger in conventional stopper mechanism. More specifically, a combination of the base-side convex part 16 and the body-side arcuate groove 35 other than a combination of the body-side convex part 33 and the base-side arcuate groove 14 can increase a number of the abutting part without a change of whole plane section of the stopper mechanism 2. Further, as the both of the above combinations are respectively provided to have two sets, the abutting part can be still increasingly doubled.

As a result, as the outside force (rotating force) received on the mirror assembly 30 is designed to disperse into the body-side convex part 33, the base-side arcuate groove 14, the base-side convex part 16 and the body-side arcuate groove 35, the stress per unit area received on each part can be made small. Thus, high stiffness and cost reduction of the stopper mechanism 2 can be obtained without high-intensity material. As it is not required to be large sizes of the body-side convex part 33 and the base-side convex part 16, a large-scale tendency of the stopper mechanism 2 or the folding outer mirror 1 can be prevented. Then, a heavy-weight tendency of the stopper mechanism 2 and the folding outer mirror 1 can be prevented.

As shown in FIG. 6, it may be constituted to form a stiffening rib 37 extending in circumferential both sides in the outer spherical side of the body-side convex part 33. The stiffening rib 37 is mounted upright in a area positioned in an outer spherical side of the body-side arcuate groove 35 provided under a lower surface of the mirror housing 31, and is constituted by triangular plates as integrally formed together with the mirror housing 31 and the body-side convex part 33. In such a constitution, a stiffness of the body-side convex part 33 can be made higher. The circumferential both sides of the body-side convex part 33 as been a form of trapezoid may be provided with the same form of stiffening rib.

Next, the result analyzed by FEM (finite element method) will be described with respect to the base-side engaging surface 51a, 51b and the body-side engaging surface 53a, 53b relating to the present invention.

As shown in FIG. 7, the FEM analysis model 100 is constituted by the base member 110 and the body member 130. The base member 110 is provided with the base-side convex parts 116, 116 formed in the base-side arcuate groove 114 and the circumferential both ends respectively. The right circumferential end 114R of the base-side arcuate groove 114 and the left end 116L of the right base-side convex part 116 slant at a raising angle of an obtuse angle relative to a rotating direction of the body member 130 to lie on the same plane, which constitutes the base-side engaging surface 51a. The left circumferential end part 114L of the base-side arcuate groove 114 and the right end surface 116R of the left base-side convex part 116 lie on the same plane as opposed to the base-side engaging surface 51a, and then to be a form of plane symmetry, which constitutes the base-side engaging surface 51b. The base-side arcuate groove 114 and the base-side convex parts 116, 116 are constituted to provide one more set thereof in order to form a symmetry in placing astride a rotation center of the body member 130.

The body member 130 is provided with the body-side convex part 133 and the body-side arcuate groove 135, 135 formed in left and right both sides. The right end 133R of the body-side convex part 133 and the left circumferential end 135L (in the side of the body-side convex part 133) of the body-side arcuate groove 135 slant at the same raising angle of obtuse angle relative to a rotating direction of the body member 130 so as to lie on the same plane, which constitutes the body-side engaging surface 53b. The left end 133L of the body-side convex part 133 and the right circumferential end 135R in the side of the body-side convex part 133) of the body-side arcuate groove 135 lie on the same plane as placed on both sides of the body-side convex part 133 to form the same plane, which constitutes the body-side engaging surface 53b. The body-side convex part 133 and the body-side arcuate groove 135, 135 are constituted to be placed at both sides of the rotating center of the body member 130 to be a form of symmetry and to form one more set.

With use of the above FEM analysis model 100, the FEM analysis has been performed at various conditions as to an inner side 101, an outer side 102, and a deep side 103 of the body-side convex part 133.

At first, when the raising angle of engaging surface is appropriately set in a range between 50 degrees and 110 degrees, and a maximum principal stress received on an inner side 101, an outer side 102, and the deep side 103 is analyzed, the result is shown in FIG. 8. In the inner side, the maximum principal stress decreases as the raising angle decreases. In the outer side, the maximum principal stress is a peak at an angle of 90 degrees, and decreases as the raising angle decreases. In the deep side, the maximum principal stress is a peak at an angle of 90 degrees, decreases at an angle of 80 degrees, increases at an angle of 70 degrees, and decreases at an angle of 50 degrees. In addition, the maximum principal stress is a minimum value at an angle of 110 degrees.

As above mentioned, in a range being a smaller than 90 degrees in the raising angle, it has been found that the maximum principal stress urged on each part of the body-side convex part 133 decreases in general as the raising angle decreases.

Next, when the raising angle of engaging surface is appropriately set in a range between 50 degrees and 90 degrees, the maximum principal stress urged on the inner side 101, the outer side 102, and the deep side 103 of the body-side convex part 133 has been analyzed in case of being with and without the stiffening rib, the result shows in FIG. 9. As shown in FIG. 9A, although the maximum principal stress decreases a little in the inner side in case of having the stiffening rib, there are few influences by the fact of with or without the stiffening rib. In addition, the maximum principal stress decreases in a range that the raising angle is less than or equal to 65 degrees in case of no stiffening rib. As shown in FIG. 9B, the maximum principal stress is small in the outer side in case of having the stiffening rib. Then, it is greatly influenced by the fact whether the stiffening rib exists or not. In addition, the maximum principal stress decreases in a range that the raising angle is less than or equal to 60 degrees in case of no stiffening rib. As shown in FIG. 9C, the maximum principal stress decreases a little in the deep side in case of having the stiffening rib. Then, it influences a few on the fact whether the stiffening rib exists or not. In addition, the maximum principal stress decreases in a range that the raising angle is less than or equal to 60 degrees in case of no stiffening rib.

As above mentioned, it has found to obtain an advantageous effect that the maximum principal stress is small in the outer side of the body-side convex part 133 as the stiffening rib provided, compared with the case having no stiffening rib.

Next, the frictional force μ of the engaging surface is set to be [0.1], [0.2], and [0.3] as the folding torque F urged to the body member 130 and the raising angle of the engaging surface is appropriately set in a range between 60 degrees and 90 degrees. Analyzing the rising force urged to the body member 130, the result shown in FIG. 10 can be obtained.

The mirror assembly is ordinarily set in the mirror base to be compressed around a rotating axis with a coil spring. Then, when the stress to rise the body member 130 urged to the engaging surface is Fv, the raising force Fu urged to the body member 130 is represented by the following equation (1).

$$Fu = Fs - Fv \qquad \text{equation (1)}$$

Herein, $$Fv = F \cdot (\cos 0 - \mu \cdot \sin \theta) \qquad \text{equation (2)}$$

Where F is a folding torque, 0 is a raising angle of the engaging surface, and μ is a frictional force of the engaging surface. and $$Fu = \leq 0 \qquad \text{equation (3)}$$

The equation (3) is a condition (practical range) in which does not cause the mirror assembly to rise.

As shown in FIG. 10A, in case of 60 Nm of the folding torque F, the body member 130 runs on at 78 degrees or less of the raising angle when the frictional force μ of the engaging surface is equal to 0.1, the body member 130 runs on at 73 degrees or less of the raising angle when the frictional force μ is 0.2, and the body member 130 runs on at 67 degrees or less of the raising angle when the frictional force μ is 0.3.

As shown in FIG. 10B, in case of 30 Nm of the folding torque F, the body member 130 runs on at 73 degrees or less of the raising angle when the friction force μ of the engaging surface is equal to 0.1, the body member 130 runs on at 66 degrees or less of the raising angle when the frictional force θ is 0.2, and the body member 130 runs on at 60 degrees or less of the raising angle when the frictional force μ is 0.3.

Thus, in a form of a first embodiment, θ is preferable to be 67 degrees or more and less than 90 degrees in the raising angle when the a frictional coefficient μ is 0.3. In this area, it can be satisfied with the above equation (3), a stiffness of the mirror base and the mirror housing can be enhanced, and the running on of the mirror assembly can be effectively prevented to exactly stop at the predetermined position of the mirror assembly. A relative position's relationship in a up-and-down direction between the mirror assembly and the mirror base can be maintained at a constant value.

Next, a second embodiment of the folding outer mirror relating to the present invention will be described with reference to FIG. 11 and FIG. 12. The folding outer mirror of this embodiment is a manual folding outer mirror.

As shown in FIG. 11, a folding outer mirror 201 relating to the second embodiment has a mirror assembly providing a mirror base 210, a shaft 220 standing upright at the mirror base 210, and a rotation frame 230 rotating around the shaft 220 being a rotating axis.

A notch 232 is formed at a lower end of the cylindrical part 231 surrounding the shaft 220. The notch 282 is designed to slant a little in a rotating direction of the mirror assembly at one end side (left side in FIG. 11) and to form a step portion to slant approximately at a right angle at the other end side (right side in FIG. 11). On the other hand, the base-side convex part 211 extending in an upper direction in the surrounding of the peripheral portion of the shaft 220 extends on an upper surface of the mirror base 210. One end surface 212 of the base-side convex part 211 is engaged with an end surface 233a of the step portion 233 of the notch 232 of the rotation frame 230 at the predetermined position such as a folded position, thus to stop the rotation frame 230 at the predetermined position. In this embodiment the stopper mechanism 202 is constituted by the notch 232 of the rotation frame 230 and the base-side convex part 211 of the mirror base 210. The body-side engaging surface 253 is constituted by the end surface 233a of the step portion 233 of the notch 232, and the base-side engaging surface 251 is constituted by one end surface 212 of the base-side convex part 211.

As shown in FIG. 12, the end surface 233a (the body-side engaging surface 253) of the step portion 233 of the notch 232 is formed to slant such that the raising angle θ relative to the rotating direction D of the mirror assembly becomes a sharp angle. The one end surface 212 (the base-side engaging surface 251) of the base-side convex part 211 is formed to slant such that the raising angle θ relative to the rotating direction D of the mirror assembly is a sharp angle (the same angle as the raising angle of the body-side engaging surface 253).

In such a constitution, as shown in FIG. 12B, when the end surface 233a of the step portion 233 of the notch 232 contacts the one end surface 212 of the base-side convex part 211, an outside force F is divided into a force acting direct on a plane (F1=F·sin θ) perpendicular to the end surface 233 and a separate force in a slip direction F2=F·cos θ. The force acting direct on a plane F1 urged to the end surface 233a is smaller than the outside force F, and the contact area of the end surface is larger than one at the time of an right angle thereof. Accordingly, the contact pressure of the contact area is small, and functions as an advantageous side relative to a stiffness of the step portion 233. Then, a stiffness of the stopper mechanism 202 becomes high.

Next, a third embodiment of the folding outer mirror relating to the present invention will be described with reference to FIG. 13 and FIG. 14. The folding outer mirror of this embodiment is an electric folding outer mirror.

As shown in FIG. 13, the folding outer mirror 301 relating to the third embodiment has a mirror assembly providing a mirror base 310, a shaft 320 standing upright on the mirror base 310, and an electric folding unit 330 rotating around the shaft 320 being a rotation axis. The feature of this embodiment is characterized in that the raising direction of the base-side engaging surface and the body-side engaging surface of the first and second embodiments is up-and-down direction. While, the folding outer mirror of this embodiment is characterized in that the raising direction of the base-side engaging surface and the body-side engaging surface directs a radial direction of the rotation of the mirror assembly.

The body-side convex part 332 extending outside in the radial direction on an outside circumferential surface of a cylindrical part 331 is formed at a lower end of the cylindrical part 331 surrounding the shaft 320 of the electric folding unit 330. As shown in FIG. 14A, the body-side convex part 332 is formed like an arcuate curve in section to rotate for opening at a predetermined angle. The center of the arcuate curve in section is the same as rotation center of the mirror assembly. Both end surfaces 332R, 332L in the circumferential direction of the body-side convex part 332 are respectively constituted to slant such that the raising angle θ raising outside relative to the rotating direction D of the mirror assembly becomes a sharp angle. That is, the body-side convex part 332 is constituted such that a length along the outer circumference is shorter than a length along the inner circumference. Then, the body-side engaging surface 353 is constituted by both end surfaces 332R, 332L in the circumferential direction of the body-side convex part 332.

The base-side convex part 311 extending an upper direction in the surrounding of the circumferential edge of the shaft 320 is formed on an upper surface of the mirror base 310. The base-side convex part 311 is formed like an arcuate curve in section so as to surround the cylindrical part 331 of the electric folding unit 330. The center of the arcuate curve in section is the same as a rotation center of the mirror assembly. The both end surfaces 311R, 311L of the base-side convex part 311 is constituted to slant such that the raising angle θ raising inwards relative to the rotating direction D of the mirror assembly becomes a sharp angle (the same angle as the raising angle of the body-side engaging surface 353). That is, the base-side convex part 311 is constituted such that a length along the inner circumference is shorter than a length along the outer circumference. Then, the base-side engaging surface 351 is constituted by the both end surfaces 311R, 311L in the circumferential direction of the base-side convex part 311.

In such a constitution, as shown in FIG. 14B, when the end surface 332L (the body-side engaging surface 353) in the circumferential direction of the body-side convex part 332 contacts the end surface 311R (the base-side engaging surface 351) in the circumferential direction of the body-side convex part 332, an outside force F urged to the body-side convex part 311 is divided into a force acting direct on a plane F1=F·sin θ perpendicular to the end surface 332L and a separate force in a slip direction F2=F·cos θ. The force acting direct on a plane F1 urged to the end surface 332L is smaller than the outside force F, and the contact area of the end surface is larger than one at the time of a right angle thereof. Accordingly, the contact pressure of the contact area is small, and functions as an advantageous side relative to a stiffness of the step portion 233. Then, a stiffness of the stopper mechanism 302 becomes high.

Although the embodiments for carrying out the present invention has been described, the present invention is not limited to the above embodiments and various modifications can be appropriately performed without departing from the spirit and the gist of the present invention Although the above embodiments has been described by giving an example of an electric folding outer mirror rotating the mirror assembly with electricity, it is not limited thereto. The manual folding outer mirror for manually rotating the mirror assembly is applicable in the present invention.

The invention claimed is:

1. A folding outer mirror having a mirror base extending outside from the side surface of a vehicle body,
a mirror assembly attached rotatably to the mirror base, and
a stopper mechanism for stopping the mirror assembly at a predetermined position,
wherein the stopper mechanism comprises
a base-side engaging surface formed in the mirror base, and
a body-side engaging surface formed in the mirror assembly and being in plane contact with the base-side engaging surface at a predetermined position, and
wherein the mirror base comprises a base-side arcuate groove that is recessed downwardly from an upper surface of a base body of the mirror base, and
a base-side convex part provided on the base body and within the base-side arcuate groove.

2. The folding outer mirror according to claim 1,
wherein the predetermined position is two positions of a folded position and a retracted position of the mirror assembly, and
the base-side engaging surface and the body-side engaging surface are respectively formed to have two surfaces.

3. The folding outer mirror according to claim 1,
wherein
the base-side arcuate groove has a center coinciding with a rotation center of the mirror assembly,
the mirror assembly is provided with the body-side convex part inserting in the base-side arcuate groove,
the base-side engaging surface comprises a circumferential end surface of the base-side arcuate groove, and
the body-side engaging surface has an end surface in a rotating direction of the body-side convex part.

4. The folding outer mirror according to claim 3,
wherein
the body-side convex part is integrally formed to have a stiffening rib extending in a circumferential direction.

5. The folding outer mirror according to claim 1,
wherein
the mirror assembly is provided with the body-side convex part engaged with the base-side convex part,
the base-side engaging surface has an end surface in a rotating direction of the mirror assembly of the base-side convex part, and
the body-side engaging surface has an end surface in a rotating direction of the body-side convex part.

6. The folding outer mirror according to claim 1,
wherein
in the folding outer mirror having the mirror base extending outside from the side surface of vehicle body and the mirror assembly attached rotatably to the mirror base,
the base-side arcuate groove has a center coinciding with a rotation center of the mirror assembly,
the mirror assembly is provided with the body-side convex part inserted in the base-side arcuate groove,
the mirror assembly is provided with the body-side arcuate groove having a center coinciding with the rotation center of the mirror assembly,
the base-side convex part being inserted in the body-side arcuate groove,
the base-side engaging surface comprises a circumferential end surface of the base-side arcuate groove and an end surface in a rotating direction of the mirror assembly of the base-side convex part,
the body-side engaging surface comprises an end surface in a rotating direction of the body-side convex part and a circumferential end surface of the body-side arcuate groove, and
when the mirror assembly is positioned at a rearward folded position or a forward retracted position,
the body-side convex part is in contact with the circumferential end surface of the base-side arcuate groove, and the base-side convex part is in contact with the circumferential end surface of the body-side arcuate groove.

7. The folding outer mirror according to claim 6,
wherein
a plurality of at least one of a combination of the body-side convex part and the base-side arcuate groove, and a combination of the base-side convex part and the body-side arcuate groove are provided.

8. The folding outer mirror according to claim 6,
wherein
at least one of the body-side convex part and the base-side convex part is provided with a stiffening rib extending in a circumferential direction.

9. The folding outer mirror according to claim 2,
wherein
the mirror base is provided with the base-side arcuate groove having a center coinciding with a rotation center of the mirror assembly,
the mirror assembly is provided with the body-side convex part inserting in the base-side arcuate groove,
the base-side engaging surface comprises a circumferential end surface of the base-side arcuate groove, and
the body-side engaging surface has an end surface in a rotating direction of the body-side convex part.

10. The folding outer mirror according to claim 9,
wherein
the body-side convex part is integrally formed to have a stiffening rib extending in a circumferential direction.

11. The folding outer mirror according to claim 2,
wherein
the mirror assembly is provided with the body-side convex part engaged with the base-side convex part,
the base-side engaging surface has an end surface in a rotating direction of the mirror assembly of the base-side convex part, and
the body-side engaging surface has an end surface in a rotating direction of the body-side convex part.

12. The folding outer mirror according to claim 7,
wherein
at least one of the body-side convex part and the base-side convex part is provided with a stiffening rib extending in a circumferential direction.

13. The folding outer mirror according to claim 1, wherein the base-side engaging surface and the body-side engaging surface are oriented such that a raising angle relative to a rotating direction of the mirror assembly is equal to or more than 67° and less that 90°.

14. The folding outer mirror according to claim 2, wherein the base-side engaging surface and the body-side engaging surface are oriented such that a raising angle relative to a rotating direction of the mirror assembly is equal to or more than 67° and less that 90°.

15. The folding outer mirror according to claim 6, wherein the base-side engaging surface and the body-side engaging surface are oriented such that a raising angle relative to a rotating direction of the mirror assembly is equal to or more than 67° and less that 90°.

* * * * *